*(12)* United States Patent
Swanson et al.

(10) Patent No.: US 8,493,624 B2
(45) Date of Patent: Jul. 23, 2013

(54) DETERMINATION OF OPTIMUM MERGE LINE LOCATIONS

(75) Inventors: John Swanson, Vancouver (CA); Andra St. Quintin, North Vancouver (CA); Daniel J. Blondal, Vancouver (CA)

(73) Assignee: Eastman Kodak Company, Rochester, NY (US)

( * ) Notice: Subject to any disclaimer, the term of this patent is extended or adjusted under 35 U.S.C. 154(b) by 1008 days.

(21) Appl. No.: 12/543,534

(22) Filed: Aug. 19, 2009

(65) Prior Publication Data

US 2011/0043862 A1   Feb. 24, 2011

(51) Int. Cl.
*H04N 1/405* (2006.01)
*G06K 15/00* (2006.01)

(52) U.S. Cl.
USPC ............................ 358/3.06; 358/1.9; 347/15

(58) Field of Classification Search
USPC ......................... 358/3.06, 3.3; 347/15, 9, 41
See application file for complete search history.

(56) References Cited

U.S. PATENT DOCUMENTS

| 5,182,990 | A | 2/1993 | Kline et al. |
| 5,329,297 | A | 7/1994 | Sanger et al. |
| 5,453,777 | A | 9/1995 | Pensavecchia et al. |
| 5,818,498 | A | 10/1998 | Richardson et al. |
| 6,249,355 | B1 | 6/2001 | Trask |
| 6,629,746 | B2 | 10/2003 | Waldner et al. |
| 2001/0038458 | A1 | 11/2001 | Klein et al. |
| 2003/0128252 | A1 * | 7/2003 | Vanhooydonck et al. ...... 347/41 |
| 2004/0027448 | A1 * | 2/2004 | Pierson .......................... 347/240 |
| 2004/0046816 | A1 * | 3/2004 | Miquel et al. .................... 347/15 |
| 2008/0284804 | A1 * | 11/2008 | Seccombe ......................... 347/9 |

FOREIGN PATENT DOCUMENTS

EP   1 367 812 A2   12/2003
WO   WO 2008/040968 A1   4/2008

* cited by examiner

*Primary Examiner* — Gabriel Garcia
*Assistant Examiner* — Quang N Vo
(74) *Attorney, Agent, or Firm* — Nelson Adrian Blish

(57) ABSTRACT

A method for forming a halftone image on recording media includes providing a recording head comprising a plurality of individually addressable recording channels. The recording head forms a plurality of image swaths, with each swath formed during a separate scan. A plurality of locations is identified within a representative unit cell of the halftone image. A quantified value for each location is determined based on a sub-scan misalignment associated with a proposed merging of two image swaths at the location corresponding to the quantified value. A merge location is selected from the plurality of locations, corresponding to a desired quantified values. The recording head forms the halftone image on the recording media while merging a first image swath and a second image swath at the selected merge location within a first unit cell of the halftone image.

11 Claims, 13 Drawing Sheets

DETERMINATION OF OPTIMUM MERGE LINE LOCATIONS

CROSS REFERENCE TO RELATED APPLICATIONS

Reference is made to commonly-assigned U.S. patent application Ser. No. 12/543,525 (now U.S. Pat. No. 8,174,552), filed Aug. 19, 2009, entitled IMPROVED MERGING OF IMAGE PIXEL ARRANGEMENTS, by John Swanson; U.S. patent application Ser. No. 12/543,530 (now U.S. Pat. No. 8,179,412), filed Aug. 19, 2009, entitled MERGING IMAGE PIXELS BASED ON MAIN-SCAN MISALIGNMENT, by John Swanson; and U.S. patent application Ser. No. 12/543,539 (now U.S. Publication No. 2011/0043833), filed Aug. 19, 2009, entitled ENHANCED IMAGING WITH ADJUSTED IMAGE SWATH WIDTHS, by Swanson et al.; the disclosures of which are incorporated herein.

FIELD OF THE INVENTION

The invention relates in general to recording apparatus employed to form images on recording media with image pixel arrangements, and in particular to printing apparatus.

BACKGROUND OF THE INVENTION

Various recording apparatus are used to form images on recording media. For example, images can be formed on a recording media by mounting the recording media on a support and operating a recording head comprising a plurality of individually addressable recording channels to form the images on the media. In such systems, images can be formed by various processes. For example, the recording channels can be operated to emit radiation beams to form an image on the recording media. In other examples, the recording channels can be operated to emit an image forming material towards the recording media to form an image thereon. In typical inkjet applications, various recording channels are used to emit drops of image forming material to form images on various recording media. In many cases, each recording channel is operated to form a unit element of image typically referred to as an image dot or image pixel.

Various image features are formed on a recording media by various image pixels patterns which include halftone patterns, stochastic patterns, and hybrid patterns. It is a common desire to form high quality images with reduced levels of artifacts. In particular, the final quality of the formed image features is typically dependant on the visual characteristics associated with the image pixel patterns themselves as well as the visual characteristics associated with the manner in which various image pixel patterns combine with other image pixel patterns.

Increased productivity requirements have led to the use of recording heads with an ever increasing numbers of recording channels. Despite these larger numbers however, it is necessary in many applications to merge a plurality of sub-images to create a desired image. Merging sub-images without artifacts along their merged borders is desirable. Banding refers to an artifact that may appear as regular or random patterns of density variations. Typically, banding can occur in the regions where various sub-images are merged. Artifacts such as banding can be caused by placement errors of the image pixels on the recording media or by visual characteristic variations among the image pixels themselves.

Various factors can adversely affect the placement requirements and/or the visual characteristics of formed image pixels. Errors in a required placement can arise from different causes including spatial misalignment between the recording head and the recording media during the formation of the image pixels. Operating variations among the various recording channels (e.g. radiation beam intensity variations) can lead to visual characteristics variations among the image pixels (e.g. density variations). The visual characteristics and/or the placement requirements of formed image pixels can also vary as function of the image data that is used to control the formation of the image pixels. One method of reducing artifacts such as banding is to design and manufacture the recording apparatus to exacting specifications. This approach however can quickly become cost prohibitive.

There is a need for effective and practical methods and systems that can permit the formation of a visually pleasing image from a plurality of sub-images. There remains a need for effective and practical methods and systems that can reduce visual artifacts associated with various misalignments between sub-images comprising various patterns of image pixels.

SUMMARY OF THE INVENTION

Briefly, according to one aspect of the present invention a method for forming a halftone image on recording media, the method includes providing a recording head comprising a plurality of individually addressable recording channels; operating the recording head to form a plurality of image swaths, each of the image swaths being formed during a separate scan over the recording media; identifying a plurality of locations within a representative unit cell of the halftone image; determining a quantified value for each location, wherein each quantified value is determined based at least on a sub-scan misalignment associated with a proposed merging of two image swaths at the location corresponding to the quantified value; selecting a merge location from the plurality of locations, the merge location corresponding to a desired one of the quantified values; and operating the recording head to form the halftone image on the recording media while merging a first image swath and a second image swath at the selected merge location within a first unit cell of the halftone image.

The invention and its objects and advantages will become more apparent in the detailed description of the preferred embodiment presented below.

BRIEF DESCRIPTION OF THE DRAWINGS

Embodiments and applications of the invention are illustrated by the attached non-limiting drawings. The attached drawings are for purposes of illustrating the concepts of the invention and may not be to scale.

DETAILED DESCRIPTION OF THE INVENTION

Throughout the following description specific details are presented to provide a more thorough understanding to persons skilled in the art. However, well-known elements may not have been shown or described in detail to avoid unnecessarily obscuring the disclosure. Accordingly, the description and drawings are to be regarded in an illustrative, rather than a restrictive sense.

Figure 1:
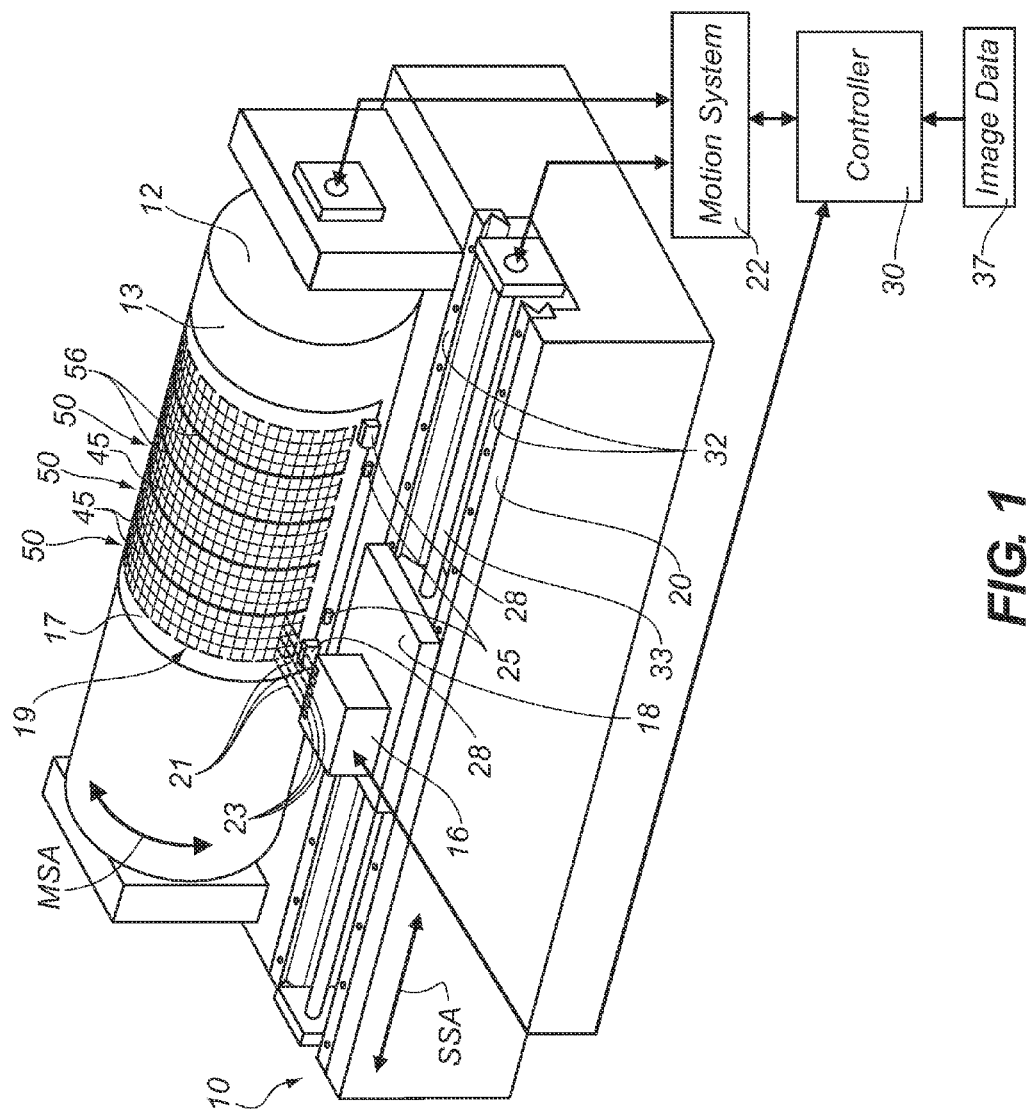
FIG. 1 shows a schematic perspective view of a recording apparatus used in an example embodiment of the invention.

FIG. 1 schematically shows a recording apparatus 10 for forming an image 19 (i.e. schematically outlined by broken lines) on a recording media 17 as per an example embodiment of the invention. Recording media 17 can include various types of media having a surface suitable for forming image 19 thereupon. For example, and without limitation, recording media 17 can include various printing elements such as printing plates, printing cylinders, and printing sleeves. Recording media 17 can include one or more recording media. Recording apparatus 10 includes a media support 12, which in this example embodiment is configured as per an external drum configuration. Other embodiments of the invention can include other forms of media supports 12 configured according to internal drum configurations or flat-bed configurations for example. In this example embodiment, recording media 17 is supported on a cylindrical surface 13 of media support 12. One or more edge portions of recording media 17 are secured to cylindrical surface 13 by clamps 28. Other example embodiments of the invention can secure recording media 17 to media support 12 by other methods. For example, a surface of recording media 17 can be secured to cylindrical surface 13 by providing a low-pressure source between the surfaces. Media support 12 is movably coupled to support 20. In this example embodiment, media support 12 is rotationally coupled to support 20. In this example embodiment, media support 12 includes a plurality of registration features 25 that are employed to position recording media 17 on media support 12 with a desired orientation.

Recording apparatus 10 includes recording head 16, which is movable relative to media support 12. In this example embodiment of the invention, media support 12 is adapted to move by rotating about a rotational axis. In this example embodiment, recording head 16 is mounted on movable carriage 18. Carriage 18 is operated to cause recording head 16 to be moved along a path aligned with the rotational axis of media support 12. Motion system 22 is employed to provide relative movement between recording head 16 and media support 12. Motion system 22 (which can include one or more motion systems) can include any suitable drives needed for the required movement. In this example embodiment of the invention, motion system 22 is used to move media support 12 along a path aligned with main-scan axis MSA and is used to move recording head 16 along a path aligned with sub-scan axis SSA. Guide system 32 is used to guide carriage 18 which is moved under the influence of transmission member 33. In this example embodiment of the invention, transmission member 33 includes a precision screw mechanism. In other example embodiments, a linear motor is employed to move recording head 16. In some example embodiments, a plurality of recording heads 16 is moved such that each of the recording heads 16 is moved independently of each other. In some example embodiments, a plurality recording heads 16 are moved in tandem.

Those skilled in the art will realize that various forms of relative movement between recording head 16 and media support 12 can be used in accordance with the present invention. For example, in some cases recording head 16 can be stationary while media support 12 is moved. In other cases, media support 12 is stationary and recording head 16 is moved. In still other cases, both the recording head 16 and the media support 12 are moved. One or both of recording head 16 and media support 12 can reciprocate along corresponding paths. Separate motion systems can also be used to operate different systems within recording apparatus 10.

In this example embodiment, recording head 16 includes a radiation source (not shown), such as a laser. In various example embodiments, recording apparatus 10 includes a plurality of individually addressable recording channels 23, each of the recording channels 23 being controllable to form various image portions on recording media 17. The plurality of recording channels 23 can be arranged in different configurations including one dimensional or two dimensional array configurations. In this example embodiment, a single recording head 16 comprises the plurality of recording channels 23.

In this example embodiment, recording head 16 is controllable to emit various radiation beams 21 while scanning over recording media 17 to form image 19. Radiation beams 21 can be image-wise modulated according to image data 37 specifying the image to be written. In this example embodiment, one or more of the recording channels 23 are driven appropriately to produce radiation beams 21 with active intensity levels wherever it is desired to form an imaged portion of image 19. Recording channels 23 not corresponding to the imaged portions are driven so as not to image corresponding areas. Each of the recording channels 23 is controllable to form a unit element of image typically referred to as an image pixel or an image dot on recording media 17 in accordance with information provided by image data 37. As shown in FIG. 1, a plurality of image pixels 45 is formed.

Various image pixels 45 can be combined with other image pixels 45 to form various features of image 19. In various example embodiments of the invention, image pixels 45 can be arranged in various image pixel patterns including halftone patterns, stochastic patterns and hybrid patterns which can combine halftone and stochastic elements for example. In some example embodiments, a plurality of separate images 19 is combined to form a final image. Each of the images 19 can be formed on a single recording media 17 or on a different recording media 17. Each of the images 19 can correspond to a different color for example. The different colors in each of the images 19 can create one or more different colors when the images 19 are combined. For example, a final image can be represented by a plurality of halftone images, each of the halftone images representing one of a plurality of different colors. Halftone images typically include various screening parameters which can include a screen ruling, a screen angle and a particular halftone dot shape format. Each of the halftone images typically comprises a different screen angle to avoid artifacts such as Moire patterns.

An image 19 can be formed on recording media 17 by different methods. For example, recording media 17 can include a modifiable surface, wherein a property or characteristic of the modifiable surface is changed when irradiated by a radiation beam 21. A radiation beam 21 can be used to ablate a surface of recording media 17 to form an image 19. A radiation beam 21 can be used to facilitate a transfer of an image forming material to a surface of recording media 17 to form an image 19 (e.g. a thermal transfer process). A radiation beam 21 can undergo a direct path from a radiation source to the recording media 17 or can be deflected by one or more optical elements towards the recording media 17. In some example embodiments of the invention, image 19 is formed with other image forming techniques. For example, in some inkjet processes, recording channels 23 can be adapted to emit image forming material towards recording media 17 to form image 19 thereon.

Controller 30, which can include one or more controllers is used to control one or more systems of recording apparatus 10 including, but not limited to, various motion systems 22 used by media support 12 and carriage 18. Controller 30 can also control media handling mechanisms that can initiate the loading or unloading of recording media 17 to or from media support 12 respectively. Controller 30 can also provide image data 37 to recording channels 23 and control recording channel 23 to form image pixels 45 in accordance with this data. Various systems can be controlled using various control signals or implementing various methods. Controller 30 is programmable and can be configured to execute suitable software and can include one or more data processors, together with suitable hardware, including by way of non-limiting example: accessible memory, logic circuitry, drivers, amplifiers, A/D and D/A converters, input/output ports, and the like. Controller 30 can comprise, without limitation, a microprocessor, a computer-on-a-chip, the CPU of a computer, or any other suitable microcontroller. Controller 30 can consist of several different or logical units, each of which is dedicated to performing a particular task in various example embodiments of the invention.

In many cases, the number of recording channels 23 is insufficient to completely form image 19 during a single marking operation. Accordingly, image 19 is formed by stitching or merging multiple sub-images together, each of the sub-images being formed during a corresponding marking operation. In various example embodiments, each sub-image includes an image pixel arrangement 50. As shown in FIG. 1, image pixels 45 are regularly arranged in each of a plurality of image pixel arrangements 50. Various ones of the image pixel arrangements 50 are merged with adjacent image pixel arrangements 50 at one of a plurality of merge lines 56. In this illustrated embodiment of the invention, each of the merge lines 56 extends primarily along a direction of main-scan axis MSA (i.e. a main-scan axis) and the merge lines 56 are arranged along a direction that is aligned with sub-scan axis SSA (i.e. a sub-scan direction).

The image pixel arrangements 50 can be formed in different ways. For example, image 19 can be formed from plurality of markings referred to as "shots." During each shot, recording head 16 is positioned relative to a region of recording media 17. Once positioned, recording channels 23 are activated to form an image pixel arrangement 50 on the region of recording media 17. Once the image pixel arrangement 50 is formed, relative movement between recording channels 23 and recording media 17 is effected to position the recording channels 23 in the vicinity of an adjacent region and another shot is taken to form a next image pixel arrangement 50.

The various image pixel arrangements 50 can also be formed by scanning. In some example embodiments of the invention, scanning can be performed by deflecting radiation beams 21 emitted by recording channels 23 relative to recording media 17. In some example embodiments, scanning can include establishing relative movement between the recording channels 23 and recording media 17 as the recording channels 23 are activated to form corresponding image pixels 45. In these example embodiments, a column comprising a series of image pixels 45 is formed along a scan direction by a given recording channel 23 as relative movement between the given recording channel 23 and the recording media 17 is established. Relative movement can include moving one or both of the recording channels 23 and recording media 17. Scanned columns of image pixels 45 formed during a single marking operation combine to form an image pixel arrangement 50 typically referred to as an image swath.

Different scanning techniques can be employed to form image swaths. For example, "circular" scanning techniques can be used to form "ring-like" or "circular" image swaths. A circular image swath can be formed when controller 30 causes recording head 16 to emit radiation beams while maintaining recording head 16 at a first position along sub-scan axis SSA and while moving recording media 17 along a direction of main-scan axis MSA. In this regard, scanning occurs solely along a main-scan direction. After the completion of a first circular image swath, recording head 16 is moved to a second position along sub-scan axis SSA. A second circular image swath is then formed as recording head 16 is operated to emit radiation beams while maintaining recording head 16 at the second position and while moving recording media 17 along a direction of main-scan axis MSA.

Helical scanning techniques can be employed to form helical image swaths which are formed in a spiral or helical fashion over a surface of recording media 17. For example, a helical image swath can be formed when controller 30 causes recording head 16 to emit radiation beams while simultaneously causing recording head 16 to move along a direction of sub-scan axis SSA and recording media 17 to move along a direction of main-scan axis MSA. In this regard, scanning occurs along both a main-scan direction and along a sub-scan direction and each helical image swath comprises an orientation that is skewed relative to main-scan axis MSA.

It is to be noted that other forms of skewed scanning techniques similar to helical scanning techniques can be used in various embodiments of the present invention. Skewed scanning techniques need not be limited to external drum configurations but can also be employed with other configurations of recording apparatus 10. For example, in some internal drum recording apparatus, media is positioned on a concave surface of a media support while a radiation beam is directed towards an optical deflector positioned along a central axis of the media support. The optical deflector is rotated while moving along central axis to cause the radiation beam to follow a spiral path on the surface of the recording media. Flat-bed recording devices can include coordinated movement between the recording channels and the recording media to form various image swaths with a particular desired orientation.

Figure 2A:
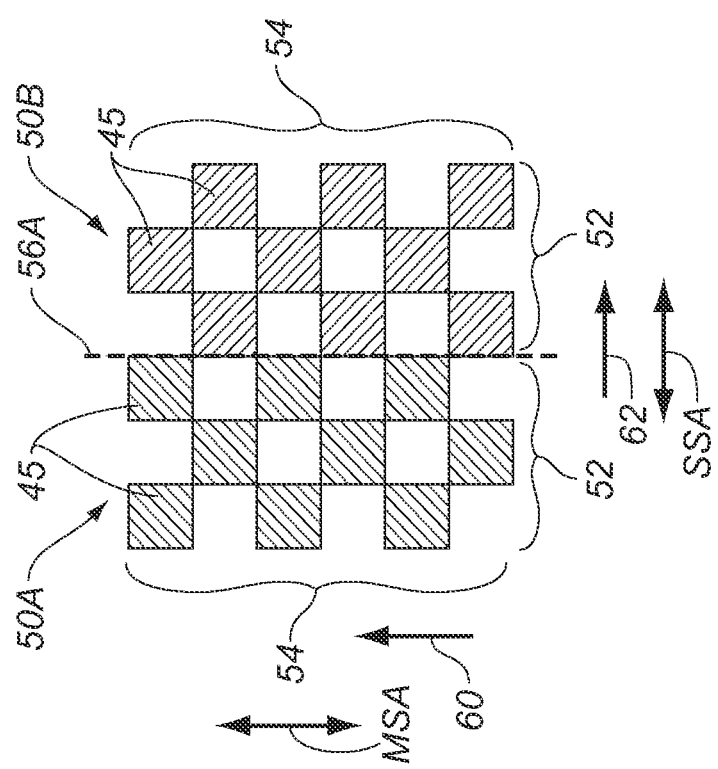
FIG. 2A shows a schematic view of a desired alignment between a first image pixel arrangement and a second image pixel arrangement at a desired merge line.

FIG. 2A schematically shows a desired alignment between a plurality of image pixels arrangements 50 that includes a first image pixel arrangement 50A and a second image pixel arrangement 50B. In this case, it is desired that each of the first and second image pixel arrangements 50A and 50B merge at merge line 56A (i.e. shown in broken lines). Each of the first and second image pixel arrangements 50A and 50B is formed during a separate marking operation. In some cases each of the first and second image pixel arrangements 50A and 50B are formed by the same group of recording channels 23 (e.g. a single recording head 16) while in other cases each of the first and second image pixel arrangements 50A and 50B are formed by a different group of recording channels 23 (e.g. different recording heads 16). Each of the first and second image pixel arrangements 50A and 50B include a plurality of image pixels columns 52 that extend along a first direction 60 and a plurality of image pixels rows 54 that extends along a second direction 62 that intersects the first direction 60. For simplicity, the first direction 60 is shown to be substantially parallel to main-scan axis MSA while second direction 62 is shown to be substantially parallel to sub-scan axis SSA. It is understood that other orientations can be readily employed. For example, skewed scanning techniques would cause the image pixel columns 52 to extend along a first direction 60 that is skewed relative to main-scan axis by some skew angle.

Various image pixels 45 are shown arranged according to a simplified checkerboard pattern having a 50% tint value in each of first and second image pixel arrangements 50A and 50B. It is desired that the checkerboard pattern be continuous across both the first and second image pixel arrangements 50A and 50B. The patterned image pixels 45 shown in FIG. 2A distinguish marked regions of each image pixel arrangement 50 from unmarked regions of each image pixel arrangement 50. The image pixels 45 in each of the first and second image pixel arrangements 50A and 50B are identified with different hatch patterns for clarity.

The desired merging of the first and second image pixel arrangements 50A and 50B at merge line 56A can lead to undesired visual artifacts that are typically referred to as stitching artifacts. Misalignment between first and second image pixel arrangements 50A and 50B can occur in several directions including a main-scan direction and a sub-scan direction. Various factors can contribute to these misalignments. For example, in some cases spatial misalignments between recording head 16 and recording media 17 during the formation of each of the first and second image pixel arrangements 50A and 50B can lead to various merging errors. Recording head 16 can be operated to emit various radiation beams 21 while forming each of the first and second image pixel arrangements 50A and 50B and the misalignment can correspond to a positional misalignment between the radiation beams and the recording media. Various factors such as vibration associated with a positioning of carriage 18 or media support 12 during the formation of one or more of the first and second image pixel arrangements 50A and 50B can lead to various merging problems. Sub-scan and main-scan misalignments can cause various image artifacts in the vicinity of merge line 56A. Whether or not an image artifact is deemed objectionable can depend on various factors including the size of the misalignment, the tint or tone value represented in the image pixel arrangements 50, and various screening parameters employed in the image pixel arrangements 50.

Figure 2B:
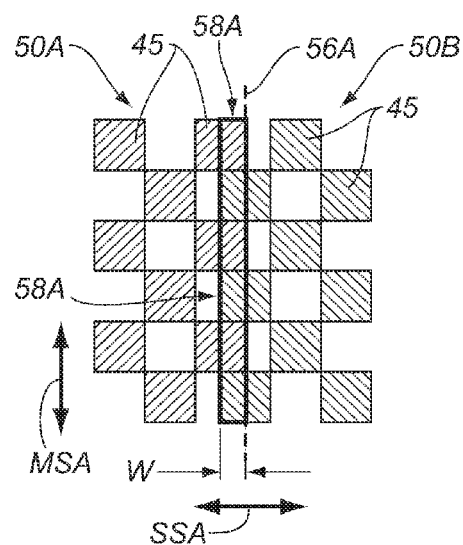
FIG. 2B shows an example of a sub-scan misalignment resulting in an overlap between the first image pixel arrangement and the second image pixel arrangement of FIG. 2A.

FIG. 2B shows an example of a sub-scan misalignment between the first image pixel arrangement 50A and second image pixel arrangement 50B of FIG. 2A. In this case, second image pixel arrangement 50B is misaligned by a half a pixel along the sub-scan axis SSA and overlaps first image pixel arrangement 50A. This sub-scan misalignment leads to the formation of a stitching artifact shown as artifact 58A. In this regard artifact 58A is shown as a continuous feature extending along a main-scan direction and comprising portions of image pixels 45 from each of the first and second image pixel arrangements 50A and 50B. For clarity, artifact 58A is outline with a bolded line.

Stitching artifacts such as artifact 58A have a plurality of properties that affect whether or not the artifact will be visible. One such property is the size or width "W" of the artifact which in this case is simply that amount by which the first and second image pixel arrangements 50A and 50B have overlapped. Another property is the amount of tint change or "Δtint" that is created by the artifact 58A as compared with the overall tints of the first and second image pixel arrangements 50A and 50B. Other properties that typically have a smaller, but still significant effect on the visibility of a stitching artifact include the sub-scan size of each image pixel arrangement 50 which may define how often the artifact repeats and the color and optical density of the recording media 17. For example, a single grey line on a white background is less visible than a black line on a white background that repeats every few millimeters or so.

Figure 2C:
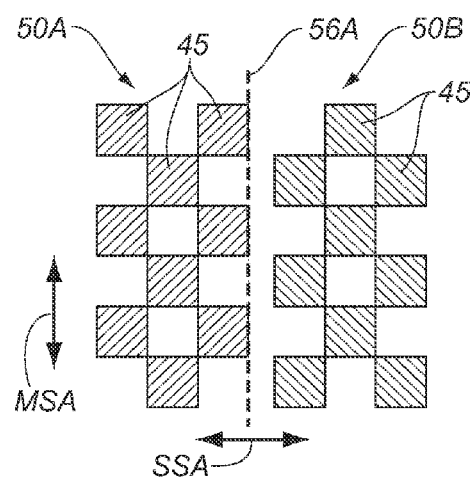
FIG. 2C shows an example of a sub-scan misalignment resulting in a gap between the first image pixel arrangement and the second image pixel arrangement of FIG. 2A.

In the case of the sub-scan misalignment shown in FIG. 2B, artifact 58A has a width W equal to half a pixel width and comprises 100% tint value (i.e. the tint value of the image pixel portions that combine to form artifact 58A). The tint of artifact 58A contrasts to the overall checkerboard pattern that has a 50% tint. Therefore, an undesired Δtint equal to 50% (i.e. 100%−50%=50%) results in the vicinity of merge line 56A. If the sub-scan misalignment occurred in the opposite direction as shown in FIG. 2C, a gap would form between first and second image pixel arrangements 50A and 50B. Since the tint of the gap would be 0%, the Δtint would once again be 50%.

Figure 2D:
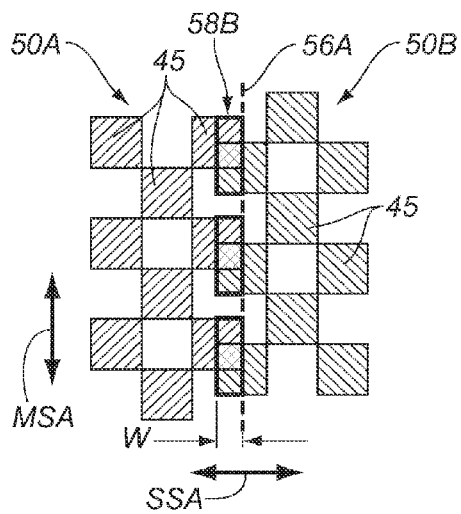
FIG. 2D shows an example of the sub-scan misalignment shown in FIG. 2B with an additional main-scan misalignment between the first image pixel arrangement and the second image pixel arrangement.

FIG. 2D shows an example of the sub-scan misalignment shown in FIG. 2B with an additional main-scan misalignment between first image pixel arrangement 50A and second image pixel arrangement 50B. In this case, the second image pixel arrangement 50B is additionally misaligned along a direction of main-scan axis MSA by half a pixel. An artifact 58B appearing as interrupted feature extending along a main-scan direction results. In this case, artifact 58B comprises a combination of non-overlapped image pixel portions and overlapped image pixel portions. For clarity, artifact 58B is outlined with bolded lines.

Figure 2E:
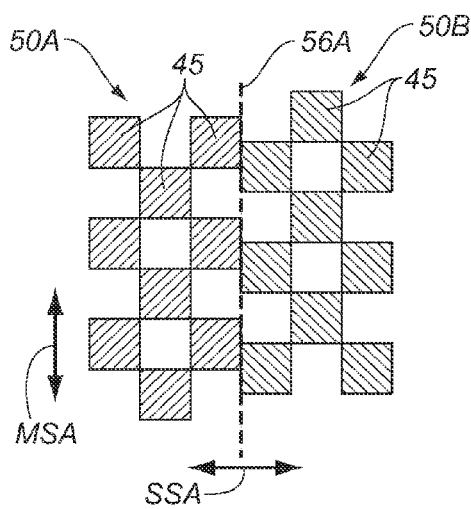
FIG. 2E shows an example of a purely main-scan misalignment between the first image pixel arrangement and the second image pixel arrangement of FIG. 2A.

Artifact 58B has a sub-scan width W that is identical to that of artifact 58A. In this example, the Δtint of the resulting artifact decreases to 25%. The present inventors have determined however that depending on the screen type and the tint of the background pattern of image pixels 45, the Δtint can either grow or shrink for a given main-scan misalignment. As shown in FIG. 2E, if the first and second image pixel arrangements 50A and 50B are subjected to a purely main-scan misalignment no artifact width (i.e. W=0) and no tint growth (i.e. Δ tint=0) would result.

Commonly-assigned U.S. Pat. No. 5,818,498 (Richardson et al.), which is herein incorporated by reference in its entirety, discloses a method for merging a plurality of image pixel arrangements 50. U.S. Pat. No. 5,818,498 discloses forming a first image pixel arrangement 50 including a first image pixel column 52 formed in accordance with first image data 37. Second image data 37 assigned for the formation of a second image pixel arrangement 50 is modified to include the first image data 37 and a second image pixel column 52 in the second image pixel arrangement 50 is formed in accordance with the first image data 37 in the modified second image data 37. The second image pixel arrangement 50 is formed such that each image pixel 45 in the second image pixel column 52 overlaps and registers with a corresponding image pixel 45 in the previously formed first image pixel column 52. In this regard, these image pixels 45 are written a plurality of times with the same image data 37. The present invention refers to this imaging technique as Escan.

In some example embodiments of the invention, two image pixel arrangements 50 are merged at merge line 56 such that a boundary of each of the two image pixel arrangements 50 falls on the merge line 56. In some example embodiments, two image pixel arrangements 50 are merged at a merge line 56 such that very little or no overlap is created between the two image pixel arrangements 50. In other example embodiments, two image pixel arrangements 50 are merged at a merge line 56 such that the two image pixel arrangements 50 overlap one another. Escan techniques taught in accordance with various example embodiments of the present invention are an example of a case where two image pixel arrangements 50 are merged in an overlapped fashion at a particular merge line 56. Accordingly, in various example embodiments of the invention, a plurality of image pixel arrangements 50 are merged at a merge line 56 that corresponds to a boundary of at least one of the merged image pixel arrangements 50. In other example embodiments, the merge line 56 corresponds to a boundary of one of the merged image pixels arrangements 50 while another of the plurality of image pixel arrangements 50 is positioned to overlap the boundary.

Figure 3A:
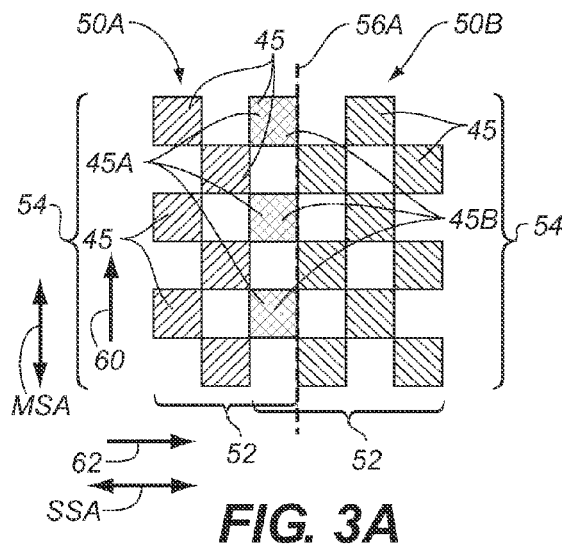
FIG. 3A shows an example of a desired alignment between the first and second image pixel arrangements of FIG. 2A using conventional Escan techniques.

FIG. 3A shows an example of merging of the previously described first and second image pixel arrangements 50A and 50B using conventional Escan techniques. Unlike the example shown in FIG. 2A where the right hand image pixel column 52 of the first image pixel arrangement 50A abuts at merge line 56A with a left hand image pixel column 52 of the second image pixel arrangement 50B, it is desired that the first and second image pixel arrangements 50A and 50B merge at merge line 56A such that that various, image pixels 45A in first image pixel arrangement 50A are overwritten with corresponding image pixels 45B in second image pixel arrangement 50B that are formed with the same image data 37. That is, image data 37 that is employed to form second image pixel arrangement 50B is modified to include image data 37 that was employed to form image pixels 45A in the first image pixel arrangement 50A. Image pixels 45B are in turn formed with this modified data. Accordingly, although the overlapped image pixels 45A and 45B are shown comprising a combination of the two hatch patterns, it is to be understood that they are also written with same image data 37. The overlapping image pixels 45A and 45B in first and second image pixels arrangements 50A and 50B are shown in "perfect register" as per conventional Escan techniques.

Figure 3B:
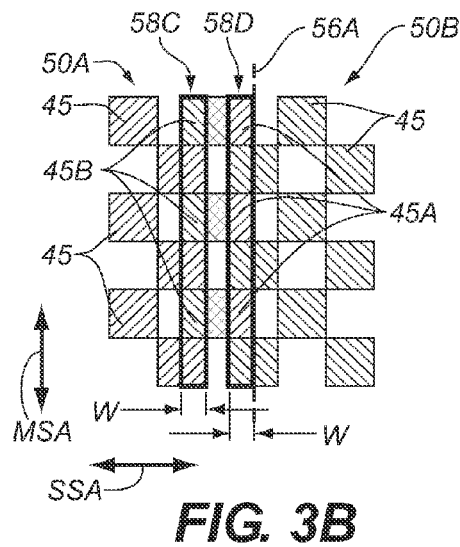
FIG. 3B shows an example of a sub-scan misalignment from the alignment shown in FIG. 3A, wherein the sub-scan misalignment is caused by a relative movement of the second image pixel arrangement towards the first image pixel arrangement.

FIG. 3B shows the effects of a sub-scan misalignment which causes a deviation form the perfect register established between the first and second image pixel arrangements 50A and 50B as shown in FIG. 3A. In this case, second image pixel arrangement 50B has undergone a half pixel sub-scan misalignment towards first image pixel arrangement 50A. As shown in FIG. 3B, the use of Escan techniques results in the formation of two artifacts 58C and 58D under the influence of the sub-scan misalignment. Each of the artifacts 58C and 58D comprises an uninterrupted feature extending along a main-scan direction. Each of the artifacts 58C and 58D has the same width W (i.e. ½ an image pixel) and the same Δtint. Since the artifacts 58C and 58D are positioned close to one another (i.e. assuming a image pixel resolution on the order of 10 microns or so), the unaided eye will not typically be able to resolve them individually. In essence, a single artifact that has a width that is twice the sub-scan misalignment is created. For clarity, each of artifacts 58C and 58D is outlined in bolded lines.

Figure 3C:
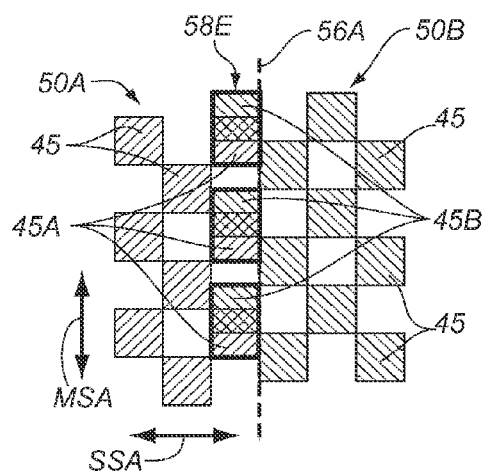
FIG. 3C shows an example of a main-scan misalignment from the alignment shown in FIG. 3A.

FIG. 3C shows the effect of a main-scan misalignment between the first and second image pixel arrangements 50A and 50B as merged with conventional Escan techniques. In this case, a main-scan misalignment has resulted in an artifact 58E that includes an interrupted feature that is one image pixel wide. Unlike the artifact shown in FIG. 2D, the amount of tint change in this example is based solely on the amount of main-scan misalignment. In this case, the main-scan misalignment is ½ an image pixel thereby resulting in a Δtint equal to 25%.

Figure 4:
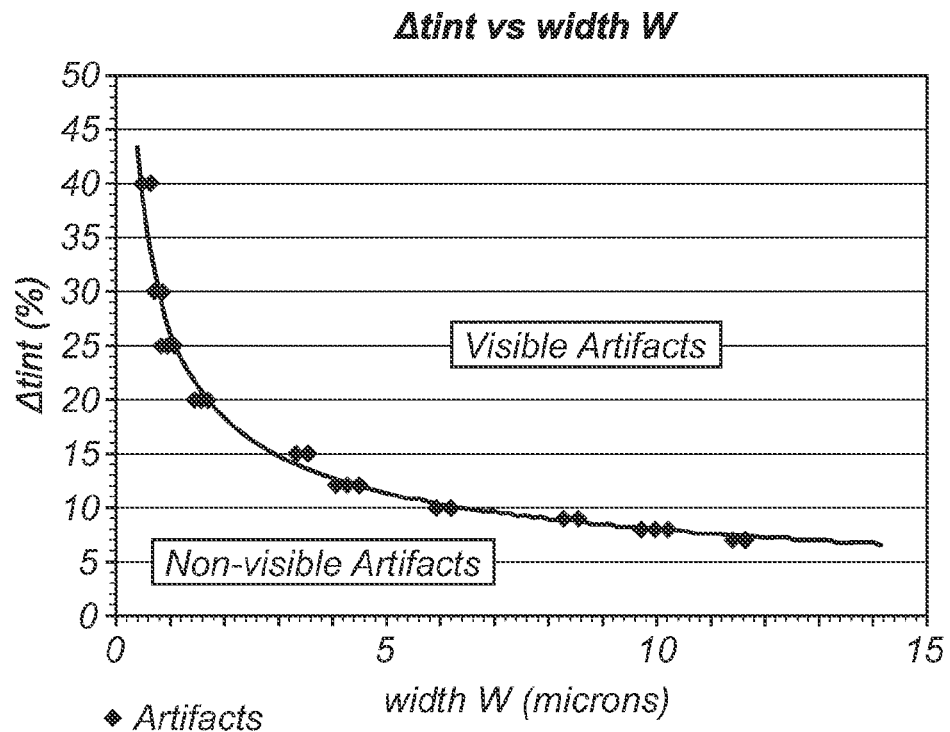
FIG. 4 shows a graph representing a measured threshold of visibility for various artifacts formed on recording media, as determined per an example embodiment of the invention.

FIG. 4 shows a graph representing a measured threshold of visibility for various artifacts formed on a recording media 17 as determined per an example embodiment of the invention. In this graph, the visibility threshold of an artifact is varied as function of two parameters: the size or sub-scan width W of an artifact and the amount of tint change "Δtint" associated with the artifact. The recording media 17 employed was the Electra Excel Thermal printing plate manufactured by the Eastman Kodak Company. Optical density and color can have a large effect on the threshold of visibility. With a maximum optical density in the range of 1.2 to 1.4 and a dark blue color, the Electra Excel Thermal printing plate was chosen to approximate a worst case scenario where black images are formed on a white background. In this case, this approximation was made when the imaged print plate was chemically processed to remove un-imaged regions of the printing plate.

The visibility threshold was measured by creating a number of different artifacts (i.e. shown by data points "♦") that varied in width W and Δtint. A 2400 dpi recording head 16 (i.e. also manufactured by the Eastman Kodak Company) capable of emitting radiation of a wavelength suitable for imaging the Electra Excel printing plate was employed. In this case, the recording head 16 comprised 224 recording channels 23. An extrapolated mathematical curve was employed to mark a perceived threshold of visible artifacts from non-visible artifacts. For example, according to the graph, an artifact having a 75% tint on a 50% background tint (i.e. Δtint=25%) would be visible if is a bit more than 1 micron wide. As another example, a 5 micron wide artifact that that has a Δtint value of 6% would not be visible according to the graph. The threshold of visibility model represented in the graph in FIG. 4 is provided by the following relationship:

$$\Delta \text{tint} = 26 * W^{-0.52}. \quad (1)$$

It is understood that other threshold of visibility models can be developed for other imaging conditions and other recording media 17. Additionally, other factors not related to imaging can have a bearing on the threshold of visibility model. For example, many imaged printing plates are chemically developed to adjust a contrast between imaged and non-imaged regions of the printing plate. Factors, such as the age of the chemical developers, temperature, and various other settings in the chemical processors can cause variances in an expected tint value.

It is understood that the perception of visibility threshold can vary from person to person and can be variable even within a single observer. To help mitigate these effects, the threshold of visibility was measured four separate times (i.e. four separate artifacts were made on four separate ones of the Electra Excel printing plates) for each test point. All these points are shown in graph in FIG. 4 without any averaging or other manipulation. It is understood that some of the data points overlap other data points and as such are not dissemble.

From the threshold of visibility model illustrated in FIG. 4, one can understand the relationship between an artifact's tint change, its size and its visibility. A simple checkerboard pattern was employed in the derivation of the threshold of visibility. This pattern can be used to readily illustrate the interactions between the various parameters of the model. However, the amount of tint change is highly dependant on various screening parameters that are employed to image the recording media 17 with a desired halftone or stochastic screen. Screening parameters such as the screen ruling (e.g. 100 lpi, 200 lpi, etc), the halftone dot shape (e.g. Euclidean, Round), the screen angle, the specific location within a unit cell where two image pixel arrangements 50 are merged, and the background tint represented in the unit cell have a significant bearing on the artifact's tint change.

Images comprising halftone screens (i.e. also known as AM screens) contain a plurality of halftone dots. Each halftone dot is represented by a select number of image pixels 45 that are imaged within a grouping of the image pixels 45 that is typically referred to as a unit cell. In this context, a background tint corresponding to the halftone dot is related to the number of image pixels 45 that are formed within the unit cell.

The exact size and spacing of the unit cells is determined by the screen ruling and screen angle of the halftone screen. However, since the image pixels 45 are arranged in a grid pattern that is defined by the imaging resolution of recording apparatus 10, the number of different screen angles, and the possible size and shapes of the unit cells is limited. Since the size and position of each image pixel 45 is fixed in the image pixel grid, the unit cells are also arranged in repeating pattern.

Figure 5:
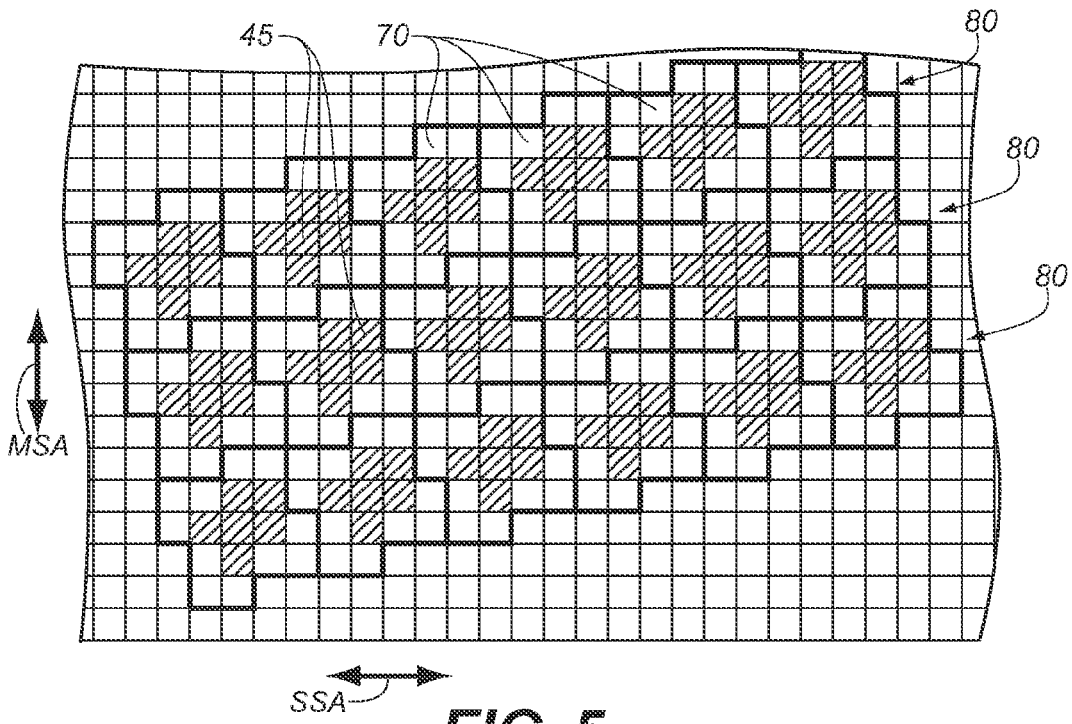
FIG. 5 shows regular pattern of unit cells that are arranged in a skewed relationship representative of a particular screen angle.

FIG. 5 shows regular pattern of unit cells 70 that are arranged in a skewed relationship with main-scan axis MSA and sub-scan axis SSA. In this case, the amount of skew is representative of a particular screen angle of an associated halftone image. Various tone levels are established in each unit cell 70 by forming a plurality of image pixel 45 (i.e. patterned for clarity) within each unit cell 70. The unit cells 70 are shown repeating seamlessly along various directions. Specifically, various unit cells 70 are arranged in rows 80. In this illustrated case, rows 80 are oriented in skewed fashion with sub-scan axis SSA. In other cases, rows 80 can have other orientations. For example, a row 80 can extend along a direction that is parallel to sub-scan direction for 0 degree and 45 degree screen angles. The unit cells 70 in each row 80 are formed with a constant pitch. Specifically, in this illustrate case, the unit cells 70 in each row 80 are formed with a pitch along a direction of sub-scan axis (i.e. a sub-scan pitch) that is equal to four image pixels 45.

One characteristic arising from the formation of unit cells 70 from the image pixel grid is that the shape of the unit cells can vary in accordance with the screen angle of an associated halftone image. For example, square or rectangular shaped unit cells 70 are usually formed for zero degree screen angles. Unit cells 70 with various "step-shaped" edges are sometimes formed for various non-zero degree screen angles.

In one example embodiment of the invention, an analysis is performed for various screen types and background tints. For each screen type and background tint, a maximum tint change "$\Delta \text{tint}_{MAX}$" is determined. In each case, different merge locations within a given unit cell 70 of the subject screen/background tint combination is modeled to determine the maximum tint change, $\Delta \text{tint}_{MAX}$ that could arise. The principles of the analysis are exemplified with reference to a unit cell 70A illustrated in FIG. 6A. In this case, unit cell 70A is considered to representative of other unit cells 70 that can be formed in the particular halftone image that is being analyzed.

Figure 6A:
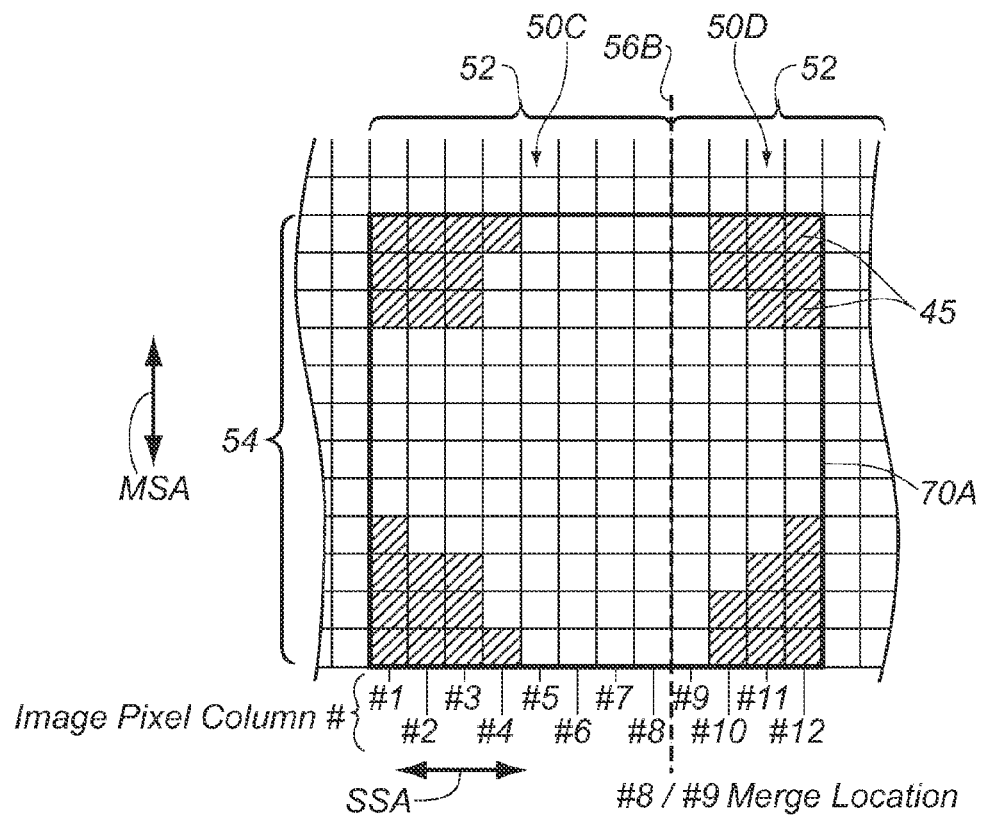
FIG. 6A shows a representative unit cell of a halftone image comprising a 25% background tint analyzed as per an example embodiment of the invention.

FIG. 6A shows a unit cell 70A that is to be formed in accordance with a 200 lpi screen ruling, a 0 degree screen angle, a Euclidean dot shape and a 25% background threshold tint. In this regard, unit cell 70A is to be formed in accordance with an image pixel grid defined by an arrangement of image pixel columns 52 and image pixels rows 54. Unit cell 70A is outlined in bolded lines for clarity. Unit cell 70A is represented by a square 12×12 portion of the image pixel grid. Thirty six image pixels 45 (i.e. twenty five percent of the 12×12 image pixel grid) are to be formed and arranged in accordance with an appropriate Euclidean dot shape. Main-scan axis MSA and sub-scan axis SSA are provided for reference.

During the formation of any unit cell 70 such as unit cell 70A, two adjacent image pixel arrangements 50 can be merged at any one of a number of sub-scan locations on the unit cell 70. For example, unit cell 70A can be formed by a first image pixel arrangement 50C which is merged with a second image pixel arrangement 50D at merge line 56B. The actual sub-scan location in which merge line 56B can fall within unit cell 70A will depend on various factors such as a sub-scan size of each of the first and second image pixel arrangements 50C and 50D, the sub-scan size of the unit cell 70A, and the specific recording channel 23 in the array of recording channels 23 that is used at the "start-of-imaging" of an image 19 comprising the unit cell 70A. Accordingly, it is to be expected that the sub-scan location of merge line 56B can fall at one of a number of possible locations within unit cell 70A. The illustrated sub-scan location of merge line 56B represents one of these possible locations. For convenience, the image pixel columns 52 within unit cell 70A are numbered #1 through #12 in FIGS. 6A, 6B and 6C. In FIG. 6A, merge line 56B is shown positioned between the #8 and #9 image pixel columns at a merge location identified as #8/#9.

Figure 6B:
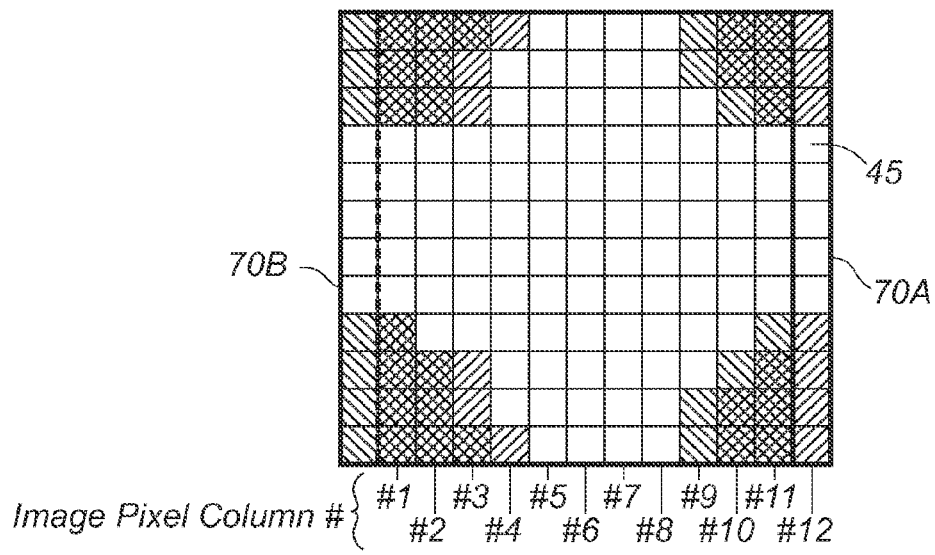
FIG. 6B simulates the resulting tint changes at each of a plurality of possible merge locations within the unit cell of FIG. 6A by double imaging the unit cell with a same unit cell.

Any sub-scan misalignment occurring between the first and second image pixel arrangements 50C and 50D that merge on unit cell 70A can cause an overlap to be created between the two adjacent image pixel arrangements 50. For example, a sub-scan misalignment can cause the rightmost image pixel column 52 of the first image pixel arrangement 50C to be overlapped by the leftmost image pixel column 52 of the second image pixel arrangement 50D. Overlapped image pixel columns 52 within the unit cell 70A can lead to tint changes. To simulate the resulting tint changes at each of a plurality of possible merge line 56B locations within unit cell 70A, unit cell 70A is "double imaged" by overlaying a same unit cell (i.e. unit cell 70B) over top, but shifted one image pixel column 52 to the left as shown in FIG. 6B. In FIG. 6B, unit cell 70B is patterned differently from unit cell 70A for clarity. The leftmost edge of unit cell 70A is shown as a hidden line to emphasize its underlying position.

Figure 6C:
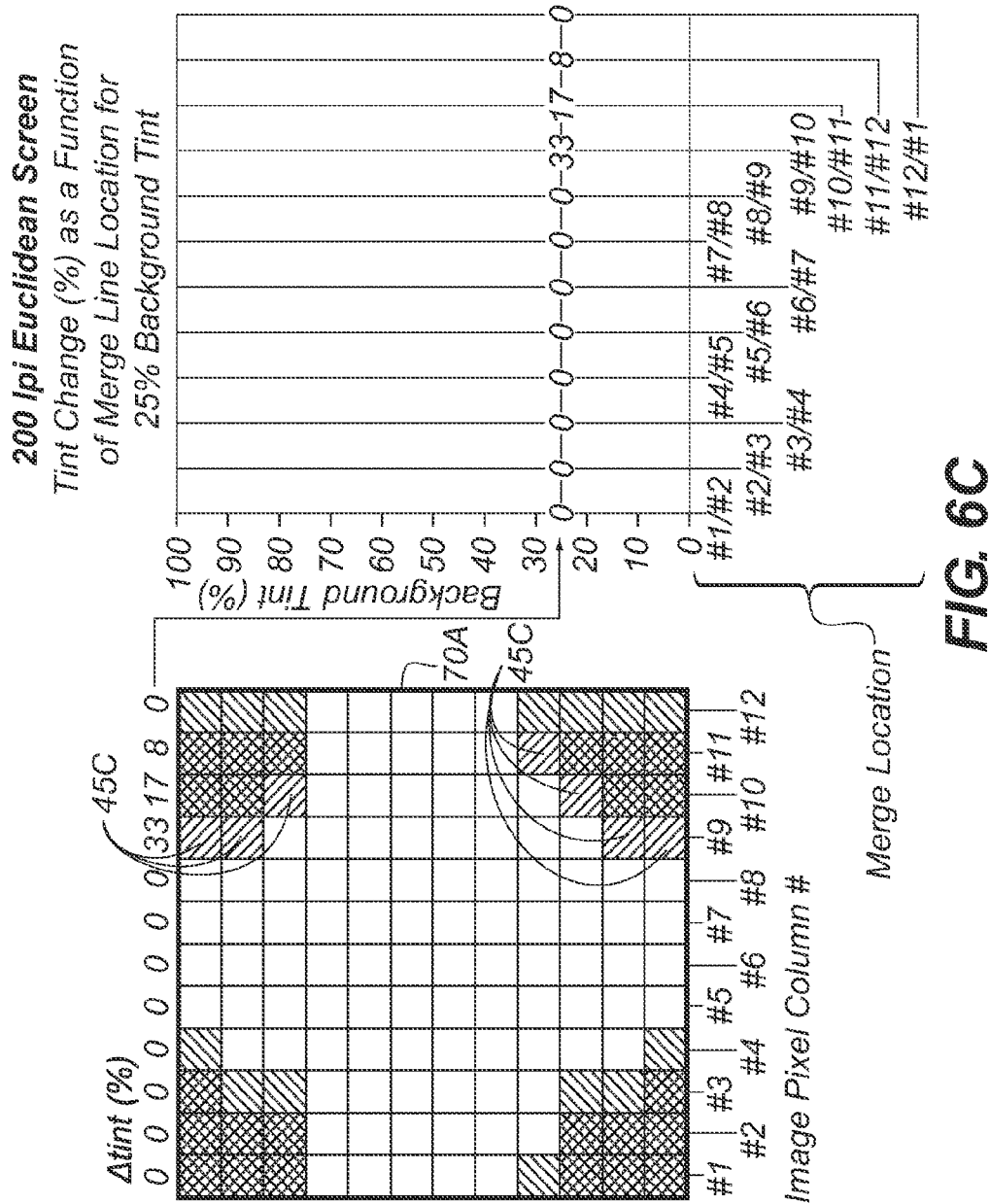
FIG. 6C maps the tint changes that occur from a possible misalignment at each of the plurality of merge locations within the unit cell of FIG. 6A.

FIG. 6C shows an altered unit cell 70A which has resulted from superimposing unit cell 70B onto 70A. In this regard, additional image pixels 45C are formed in unit cell 70A above those required by the 25% screen. Accordingly, a tint growth occurs in some of the image pixel columns 52. FIG. 6C additionally shows a mapping of the tints growths as a function of the various possible merge locations within unit cell 70A. In FIG. 6C, the additionally image pixels 45C are patterned solely in accordance with the image pixel patterning of unit cell 70B for clarity.

In this example embodiment, the analysis indicates that the #9, #10 and #11 image pixel columns 52 have an additional 4, 2, and 1 image pixels 45C respectively. Dividing the number of additional image pixels 45C by the by the total number of image pixels 45 associated with each of the image pixels columns 52 in the unit cell 70A (i.e. 12 in this case) results in a 33% tint change for the #9 image pixel column 52, a 17% tint change for the #10 image pixel column 52 and a 8% tint change for the #11 image pixel column 52.

Accordingly, as represented by FIG. 6C, the tint change associated with the sub-scan misalignment depends not only on the location of merge line 56B within the unit cell 70A but also on the background tint of the unit cell 70A. This example approximates the tint changes associated with a sub-scan misalignment at each of the possible sub-scan locations of merge line 56B, but for only a single background tint value of 25%. As shown in FIG. 6C, each tint growth value is mapped in accordance with its relationship to a merge location with unit cell 70A and to a single background tint value of 25% of unit cell 70A.

Figure 6D:
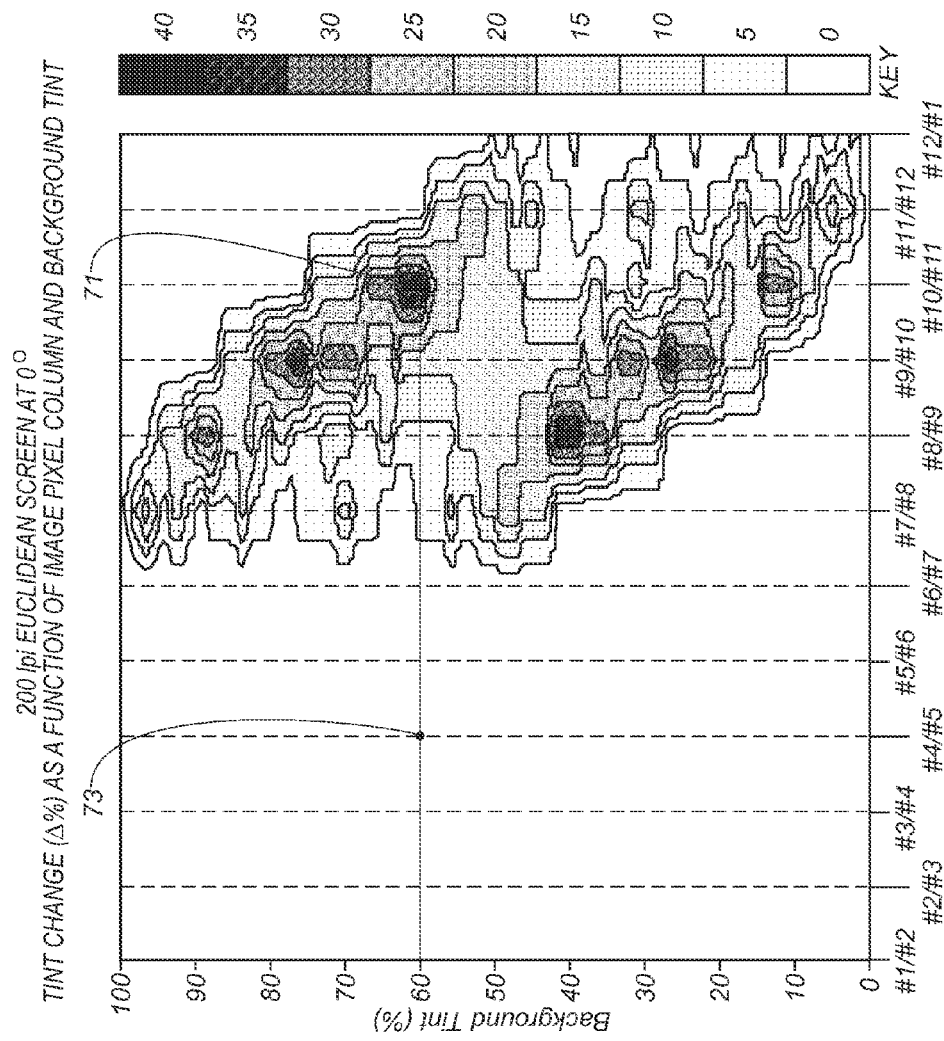
FIG. 6D represents a version of the mapping of FIG. 6C that is expanded to include tint change values for other background tint levels ranging from 0% to 100%.

In this example embodiment, this analysis is repeated for all the other possible background tint values of unit cell 70A. In this regard, FIG. 6D shows an expanded version of the FIG. 6C mapping that includes tint change values for various background tint ranging from 0% to 100%. It is to be noted that different tint change values are positioned in various regions of the mapping in accordance with the illustrated KEY in FIG. 6D. However, it is to be noted that in this case, the various tint change values are only valid for corresponding integer values of the merge locations.

The data in FIG. 6D shows that no tint growth occurs as a consequence of a sub-scan misalignment at any of approximately half of the possible locations for merge line 56B. However, tint growth is encountered at various other remaining locations and the amount of tint growth that occurs is dependant on the background tint. Some of the tint growths have magnitudes that make them particularly undesired.

Analysis of the data in FIG. 6D can lead to several results. Firstly, an image 19 that does not change in tint in region of recording media 17 that is intersected by a merge line 56 may be susceptible to artifacts. Specifically, for a given background tint, the particular location within a unit cell 70 of the image 19 that a merge line 56 falls will determine the likelihood of an artifact forming as well as the severity of the artifact. For example, if merge line 56B occurred between image pixel columns #10 and #11 of unit cell 70A, a constant background tint of approximately 60% would experience a tint growth of approximately 40% for its duration (i.e. see point 71 in FIG. 6D). If merge line 56B occurred between the image pixel columns #4 and #5 of unit cell 70A, the same background tint of 60% would experience a 0% tint growth (i.e. see point 73 in FIG. 6D). Secondly, the severity of any tint growth that arises at specific location of the unit cell 70 changes as the background tint changes. Accordingly, an image 19 that includes a wide range of background tints would be less likely to display an artifact from a misalignment arising at a merge line 56 running through the unit cells 70 representing the different tint values.

The tint growth model shown in FIG. 6D is representative of a single screen angle of 0 degrees and is not representative of all screen angles. Tint growth characteristics depend on the specific screen that is employed and consequently vary in accordance with its screen angle. Worst case, or maximum tint growths $\Delta tint_{MAX}$ determined in accordance with an example embodiment similar to that referenced in FIGS. 6A to 6D are listed in Table 1 for various screen types that include different screen angles. The screen types shown in Table 1 include halftone screens comprising Euclidean and Round halftone dots at various screen rulings. The screen types also include various include various stochastic or FM screens that employ a particular FM sized dot. For example, the FM 10 screen employs 10 micron dots that are stochastically arranged.

TABLE 1

Worst case tint growth $\Delta tint_{MAX}$ (in Δ %) for various screens

| Dot | | Screen Angle (°) | | | | | | |
|---|---|---|---|---|---|---|---|---|
| lpi | Type | 0° | 7.5° | 15° | 22.5° | 30° | 37.5° | 45° |
| 150 | Euclidean | 41.7 | 6.1 | 6.5 | 6.4 | 7.3 | 5.6 | 50.0 |
| 150 | Round | 50.0 | 6.5 | 7.5 | 7.1 | 8.8 | 6.8 | 36.4 |
| 200 | Euclidean | 41.7 | 8.1 | 8.5 | 8.4 | 14.1 | 7.2 | 51.1 |
| 200 | Round | 54.5 | 8.5 | 8.5 | 9.6 | 14.9 | 8.6 | 41.2 |
| 300 | Euclidean | 57.1 | 11.5 | 11.3 | 12.0 | 11.3 | 10.5 | 50.0 |
| 300 | Round | 71.5 | 11.6 | 11.9 | 13.4 | 13.3 | 12.2 | 41.2 |
| 450 | Euclidean | 60.0 | 18.4 | 16.0 | 17.5 | 18.3 | 15.3 | 53.3 |
| 450 | Round | 60.0 | 17.6 | 16.3 | 18.0 | 20.7 | 17.0 | 46.7 |
| 615 | Euclidean | 69.5 | 20.7 | 21.4 | 22.3 | 23.8 | 20.4 | 54.5 |
| 615 | Round | 90.3 | 21.3 | 20.7 | 22.3 | 24.9 | 22.7 | 54.6 |
| | FM 10 | | | | | 30.7 | | |
| | FM 20 | | | | | 23.8 | | |
| | FM 25 | | | | | 30.7 | | |

The data shown in Table 1 shows that for a given halftone image, the 0 degree and 45 degree screen angles have much higher worst case tint change values than the other screen angles. Consequently, various halftone images employing the 0 degree and 45 degree screen angles are more susceptible to the formation of visible artifacts arising from a misalignment between two merged image pixel arrangements 50. This in turn places a more onerous requirement on the placement accuracy of the image pixel arrangements 50 to avoid these artifacts. For example, Table 1 indicates that a maximum 41.7% tint change is associated with a 200 lpi Euclidean screen comprising a 0 degree screen angle. To avoid this maximum tint change value, the threshold of visibility curve shown in FIG. 4 indicates that the width W of the artifact would have to be less than 1 micron. Accordingly, placement control of the image pixel arrangements 50 also needs to be less than 1 micron.

Figure 7D:
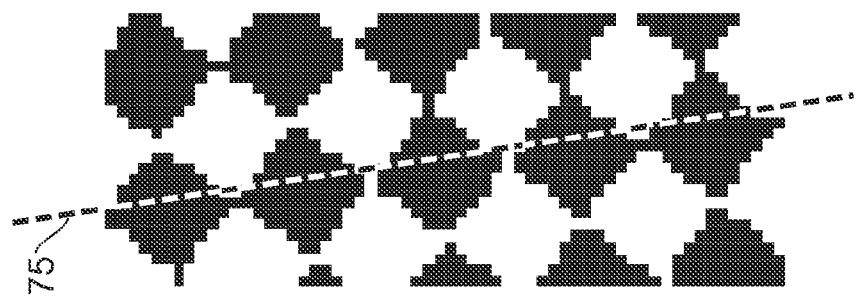
FIG. 7D shows a Euclidean 200 lpi screen at a 7.5 degree screen angle with a 50% background tint.
Figure 7C:
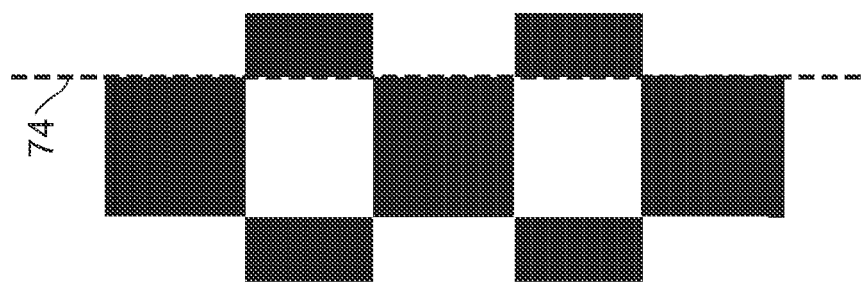
FIG. 7C shows a Euclidean 200 lpi screen at a 45 degree screen angle with a 50% background tint.
Figure 7B:
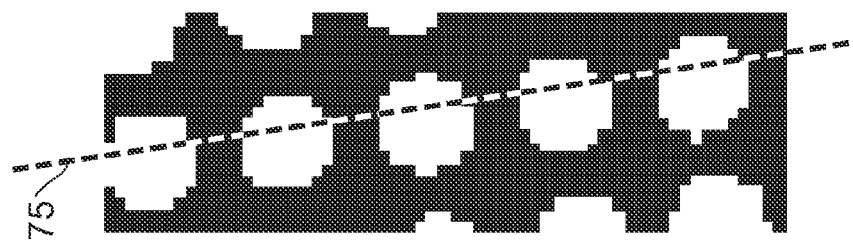
FIG. 7B shows a Euclidean 200 lpi screen at a 7.5 degree screen angle with a 63% background tint.
Figure 7A:
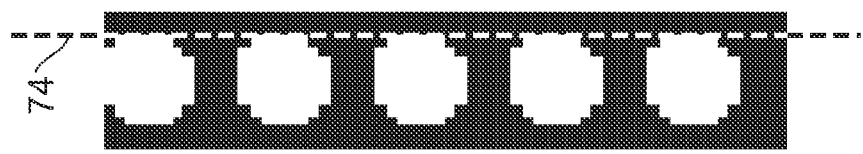
FIG. 7A shows a Euclidean 200 lpi screen at a 0 degree screen angle with a 63% background tint.

A possible reason that the 0 degree and 45 degree screen angles are more particularly sensitive than other screen angles to misalignments between merged image pixel arrangements 50 is shown in FIGS. 7A, 7B, 7C, and 7D. FIGS. 7A and 7B compare Euclidean 200 lpi screens at 0 degree and 7.5 degree screen angles respectively and both with 63% background tints. FIGS. 7C and 7D compare Euclidean 200 lpi screens at 45 degree and 7.5 degree screen angles respectively and both with 50% background tints. As shown in FIGS. 7A and 7C, an arrangement direction (i.e. represented by broken lines 74) of the halftone dots formed at the 0 degree and 45 degree screen angles shows that all these halftone dots are all aligned vertically. This situation can lead to high tint growths when misalignment between merged image pixel arrangements 50 occurs in the vicinity of a merge line 56 that extends along this arrangement direction. By contrast, an arrangement direction (i.e. represented by broken lines 75) of the halftone dots formed at the 7.5 degree screen angles in FIGS. 7B and 7D are skewed with respect to vertical direction associated with an orientation of a proposed merge line 56. Consequently, any tint growth associated with a merge line 56 falling within a unit cell 70 associated with these halftone images will be much less pronounced.

In some example embodiments, as an alternative to such stringent placement requirements of the image pixel arrangements 50, particular screen angles associated with high tint growths are avoided. Table 1 indicates that the various screen types having screen angles of 7.5°, 15°, 22.5°, and 37.5° tend to have the lowest tint growth values. While the 30 degree screen angles have slightly higher worst case tint growth values, they are still much lower than those associated with the 0 degree and 45 degree screen angles.

In some example embodiments of the invention, the positioning of various merge lines 56 is controlled to avoid locations within a unit cell associated with an undesired tint growth. As previously described, adjacent image pixel arrangements 50 can merge at a number of different locations within a unit cell 70 and some of these locations are more susceptible to undesired tint growth than others. In some example embodiments, these locations are identified and avoided.

In one example embodiment of the invention, a unit cell 70 representative of a particular set of screen parameters (i.e. a representative unit cell 70) within a halftone image is identified. Within the representative unit cell 70 a plurality of locations are identified. In some example embodiments, each of the locations corresponds to a boundary of an image pixel column 52 within the representative unit cell 70. In some example embodiments, each of the locations corresponds to a boundary between adjacent image pixel columns 52 within the representative unit cell 70. In some example embodiments, each of the locations corresponds to a sub-scan position. In other example embodiments, each of the locations corresponds to a possible desired placement location of a boundary of an image pixel arrangement 50. In this example embodiment, a quantified value is determined for each location. Each of the quantified values is determined based at least on a sub-scan misalignment associated with a proposed merging of two image pixel arrangements 50 at the location corresponding to the quantified value. In some example embodiments, each quantified value is representative of a tint change associated with a possible misalignment between two image pixels arrangements 50 merged at the location corresponding to the quantified value. The tint change can be associated with a portion of an image pixel pattern formed within an image pixel column 52 of one of the two image pixel arrangements 50. The misalignment can be a sub-scan misalignment.

Each quantified value can be determined based at on a background tint of the representative unit cell 70. In some example embodiments, each background tint of a plurality of different background tints is sequentially imposed on the representative unit cell 70. At each of a plurality of locations within the representative unit cell 70, a plurality of tint change values is determined. Each of the tint change values represents a change in a different one of the background tints arising from a possible sub-scan misalignment associated with a proposed merging of two image pixel arrangements 50 at the corresponding location. A plurality of quantified values is determined such that each quantified value represents one of the tint change values determined for the location corresponding to the quantified value. Each determined quantified value can represent a maximum tint change value.

In this example embodiment, a desired merge location is selected from the plurality of locations. In this example embodiment, the desired merge location is a location within a unit cell 70 that is associated with reduced presence of artifacts caused by a potential misalignment between two image pixel arrangements 50 that are to be merged at that location. In particular, the merge location corresponds to a desired one of the quantified values. In some example embodiments, one or more of the locations associated with a maximum tint change is determined, and the desired quantified value is selected to correspond to one of the locations other than the one or more locations that are associated with a maximum tint change value. In some example embodiments, the desired quantified value corresponds to one of the locations that is associated with a minimum tint change value. The desired quantified value can correspond to a plurality of different ones of the locations.

In this example embodiment, recording apparatus 10 is controlled to merge a first image pixel arrangement 50 with as second image pixel arrangement 50 at a selected merge location when forming an image 19. In some example embodiments, this process is not conducted for all halftone images associated with image 19, but rather for selected ones of the halftone images. For example, a screen angle of the halftone image can be identified and the aforementioned process can be conducted in the event that the screen angle is determined to be 0 degrees or an integer multiple of 45 degrees. In some cases when the screen angle is an integer multiple of 45 degrees, it is noted that the unit cells 70 are rotated by 45 degrees and as such, the desired location of a merge line 56 in a first one of these rotated unit cells 70 may fall in an undesired location in a second one of the these rotated unit cells 70. In these cases, the aforementioned process can be conducted on a virtual "square" unit cell 70 made up of the adjacent quadrants of four separate unit cells 70 that are rotated in accordance with the 45 degree screen angle. In some example embodiments, a location of a merge line 56 is determined randomly in the event that halftone image comprises a screen angle other than 0 degrees or an integer multiple of 45 degrees.

This process allows for the merging of two of the image pixel arrangements 50 at a desired location within a unit cell 70 within image 19. However, image 19 is typically formed from additional image pixel arrangements 50, and each successive one of these additional image pixel arrangements 50 is required to be merged with a previously formed image pixel arrangement 50. Typically, a plurality of unit cells 70 are formed across a region of recording media 17 that is bounded by two adjacent merge lines 56. Consequently, the relative size of the image pixel arrangements 50 between successive merge lines 56 will affect where a merge line 56 becomes located within other unit cells 70 of the halftone image. Although, a first merge line 56 can be located at a merge location that is selected to avoid an undesired tint change within a first unit cell 70 of image 19, the sizes of the successively formed image pixel arrangements 50 can cause a successively formed merge line 56 to be formed at a location within a second unit cell 70 that is associated with an undesired tint change.

In many cases, a spacing between adjacent merge lines 56 is related to number of recording channels 23 in recording head 16. The total number of employed recording channels 23 is typically dictated by various requirements such as imaging throughput. These requirements can conflict with a need to position a merge line 56 at a desired merge position with a unit cell 70. In some example embodiments, a distance between adjacent merge lines 56 is adjusted to cause each successive merge line 56 to fall at a desired location within a unit cell 70 of an image 19. For example, an image 19 can be made while forming a plurality of image swaths. The positions of a first image swath and a second image swath can be controlled to cause a location of a merge line 56 between the two to fall at a desired merge location within a first unit cell 70 of the image 19. A sub-scan size of the second image swath can be further adjusted to cause a location of a merge line 56 between the second image swath and a third image swath to also fall at a desired merge location within a second unit cell 70 of the image 19. In some example embodiments, a sub-scan size of each of the image swaths is varied to cause each merge line 56 to fall at a desired merge location with a unit cell of image 19. In some example embodiments, a sub-scan size of one of the image swaths is adjusted to be different than a sub-scan size of another of the image swaths. For example, in the previously described embodiment, a sub-scan size of the second image swath can be adjusted to be different than at least one of the first image swath and the third image swath.

In some example embodiments, the sub-scan pitch of the image swaths is adjusted to cause each of the image swaths to merge with another of the image swaths at the selected merge location within a unit cell 70 of a halftone image. In one example embodiment, a number of the recording channels 23 in recording head 16 that is required to form an integer number of complete unit cells 70 of a halftone image across a region of the recording media bounded by two adjacent merge lines during a single scan or marking operation is determined. In various example embodiments, the integer number of complete unit cells 70 is 2 or greater. At least one of the recording channels 23 is disabled to configure the recording head 16 in accordance with the determined number of the recording channels 23. The configured recording head 16 is then employed to form the halftone image on recording media 17 while forming the plurality of image swaths.

In another example embodiment, a sub-scan pitch of unit cells 70 in a row 80 of the unit cells 70 in a halftone image is determined. In this example embodiment, the row 80 of unit cells 70 extends along a direction that is parallel to sub-scan axis SSA. The number of the recording channels 23 that are required to form only an integer number of complete unit cells 70 in the row 80 of unit cells 70 during a single scan over the recording media 17 is also determined. In various example embodiments, the integer number of complete unit cells 70 is 2 or greater. The determined number of the recording channels 23 is typically less than the total number of the recording channels 23 in the recording head 16. At least one of the recording channels 23 is disabled to configure the recording head 16 with at least the determined number of the recording channels 23 and the configured recording head 16 is operated to form the halftone image on recording media 17 such that a sub-scan pitch of the image swaths adjusted to be equal to an integer multiple of the determined sub-scan pitch of the unit cells 70. In this example embodiment, the sub-scan pitch of the image swaths is greater than the determined sub-scan pitch of the unit cells 70. In some example embodiments, a sub-scan size of each image swath is adjusted to be equal to the integer multiple of the sub-scan pitch of the unit cells 70. For example, when the configured recording head 16 is operated to merge adjacent image swaths with effectively no overlap, the image swaths will typically comprise a sub-scan width that is equal to an integer multiple of the sub-scan pitch of the unit cells 70. In some example embodiments, the configured recording head 16 is operated to form the plurality of the image swaths such that at least one of the image swaths overlaps another of the image swaths. Image swath overlap can be required for various reasons including when Escan techniques are employed. Nonetheless, in these example embodiments, the image swath sub-scan pitch is maintained to equal an integer multiple of the sub-scan pitch of the unit cells 70. In various example embodiments of the invention, overlaps on the order of one or more image pixels 45 or a portion of an image pixel 45 can be employed.

Although an image swath sub-scan pitch can be selected to equal an integer multiple of the a sub-scan pitch of the unit cells 70 of a particular halftone image, an integer number of complete unit cells 70 need not be formed on a region of recording media 17 bounded by two adjacent merge lines 56. In some example embodiments, the configured recording head is operated to form at least one complete unit cell 70 and at least one partial unit cell 70 in each image swath. In some example embodiments, the configured recording head 16 is operated during a single scan to form at least one complete unit cell 70 and at least one partial unit cell 70 on a region of the recording media 17 that is bounded by two adjacent merge lines 56. The formation of partial unit cells 70 can be required for various reasons including a desire to locate a specific merge line 56 at a specific merge location within a unit cell 70. The at least one complete unit cell 70 and the at least one partial unit cell 70 can be formed in a row 80 of the unit cells. In these example embodiments the sub-scan pitch of the image swaths is greater than the sub-scan pitch of the unit cells 70.

In some example embodiments, one or more recording channels 23 are not disabled to configure recording head 16 to cause a sub-scan pitch of the image swaths to be adjusted to equal to the integer multiple of the sub-scan pitch of the unit cells 70 in various ones of different halftone images. An image 19 can comprise a plurality of halftone images, each of the halftone images comprising a different screen angle. Since some of these different screen angles may be less prone to stitching artifacts, different numbers of recording channels 23 can be employed to form these halftone images. For example, the screen angle of a halftone image can be determined and one or more recording channels 23 can be disabled to adjust a sub-scan pitch of the image swaths to be equal to the integer multiple of the sub-scan pitch of the unit cells 70 of the halftone image in the event that the screen angle is determined to be 0 degrees or an integer multiple of 45 degrees. In the event that the screen angle is determined to be other than 0 degrees or an integer multiple of 45 degrees, a different number of recording channels 23 is employed to form the halftone image. The different number of recording channels can include the entirety of the recording channels 23 in recording head 16.

Since the various halftone images that are combined to form an image 19 comprise different screen angles, the unit cells 70 in each of the halftone images can be accordingly arranged with different sub-scan pitches. In some example embodiments, different numbers of recording channels 23 are disabled for each of a plurality of different halftone images which are to be formed with image swaths comprising a sub-scan pitch that is to be adjusted to equal the sub-scan pitch of their respective unit cells 70. For example, an image 19 can include a first halftone image having a first screen angle (e.g. 0 degrees) and a second halftone image having a second screen angle that is different than the first screen angle (e.g. 45 degrees). A row 80 of first unit cells 70 in the first halftone image can be selected and a first sub-scan pitch of the first unit cells 70 is determined. Recording head 16 is operated to form the first halftone image on recording media 17 while forming a first group of the image swaths, in which a first sub-scan spacing between two adjacent merge lines 56 in the first group of the image swaths is adjusted to equal to an integer multiple of the determined first sub-scan pitch. A row 80 of second unit cells 70 in the second halftone image is selected and a second sub-scan pitch of the second unit cells 70 is determined. Recording head 16 is then reconfigured by disabling at least one of the recording channels 23. The reconfigured recording head 16 is then operated to form the second halftone image on recording media 17 while forming a second group of the image swaths, wherein a second sub-scan spacing between two adjacent merge lines 56 in the second group of the image swaths is equal to an integer multiple of the determined second sub-scan pitch. In this example embodiment, the second halftone image is registered atop of the first halftone image. Accordingly, recording head 16 can be configured to form each of plurality of different halftone images with an appropriate number of recording channels 23 that are selected to balance overall imaging productivity with a desire to reduce the occurrences of stitching artifacts. In some example embodiments, each halftone image is formed on a common recording media 17. In other example embodiments, recording media 17 comprises a plurality of media and each halftone image is formed on a different one of the media. In some example embodiments recording media 17 comprises a plurality of surfaces and each halftone image is formed on a different surface of recording media 17.

According to the threshold of visibility model illustrated in FIG. 4, an artifact of a given $\Delta$tint is not likely visible as long as it is below a specified threshold width W. Therefore, to assess whether an artifact created by a sub-scan misalignment between merged image pixel arrangements 50 would be visible, one would need to determine the maximum tint growth $\Delta\text{tint}_{MAX}$ for a given screen and then determine the allowable sub-scan misalignment from the model. For an artifact created from a main-scan misalignment, the procedure is the same, except that the actual tint growth is determined by a product of the maximum tint growth $\Delta\text{tint}_{MAX}$ for a given screen and the main-scan misalignment (expressed as a percentage of an image pixel 45). However, misalignments can simultaneously occur both along a sub-scan direction and a main-scan direction during a given image forming operation. The threshold of visibility model represented by relationship (1) can be modified to include both main-scan and sub-scan effects as described below:

Specifically, relationship (1) can be rewritten as:

$$\Delta\text{tint} * W^{0.52} = 26. \tag{2}$$

Relationship (2) can be further rewritten to represent a main-scan and sub-scan artifact having the same width W as:

$$(\Delta\text{tint}_{SUBSCAN} * W^{0.52}) + (\Delta\text{tint}_{MAINSCAN} * W^{0.52}) = 26. \tag{3}$$

When Escan techniques are not employed, one may equate the artifact width W to the amount of sub-scan shift caused by the sub-scan misalignment, and relationship (3) can be rewritten as follows:

$$(\Delta\text{tint}_{SUBSCAN} * \text{shift}_{SUBSCAN}^{0.52}) + (\Delta\text{tint}_{MAINSCAN} * \text{shift}_{MAINSCAN}^{0.52}) = 26. \tag{4}$$

By equating $\Delta\text{tint}_{SUBSCAN}$ to the maximum tint growth $\Delta\text{tint}_{MAX}$ based on a particular screen and by approximating $\Delta\text{tint}_{MAINSCAN}$ as a product of $\Delta\text{tint}_{SUBSCAN} * \text{shift}_{MAINSCAN}$, relationship (4) can be finally rewritten as:

$$\text{shift}_{MAIN-SCAN} = (26/(\Delta\text{tint}_{MAX} * \text{shift}_{SUBSCAN}^{0.52})) - 1$$
for a particular screen. (5)

Figure 8:
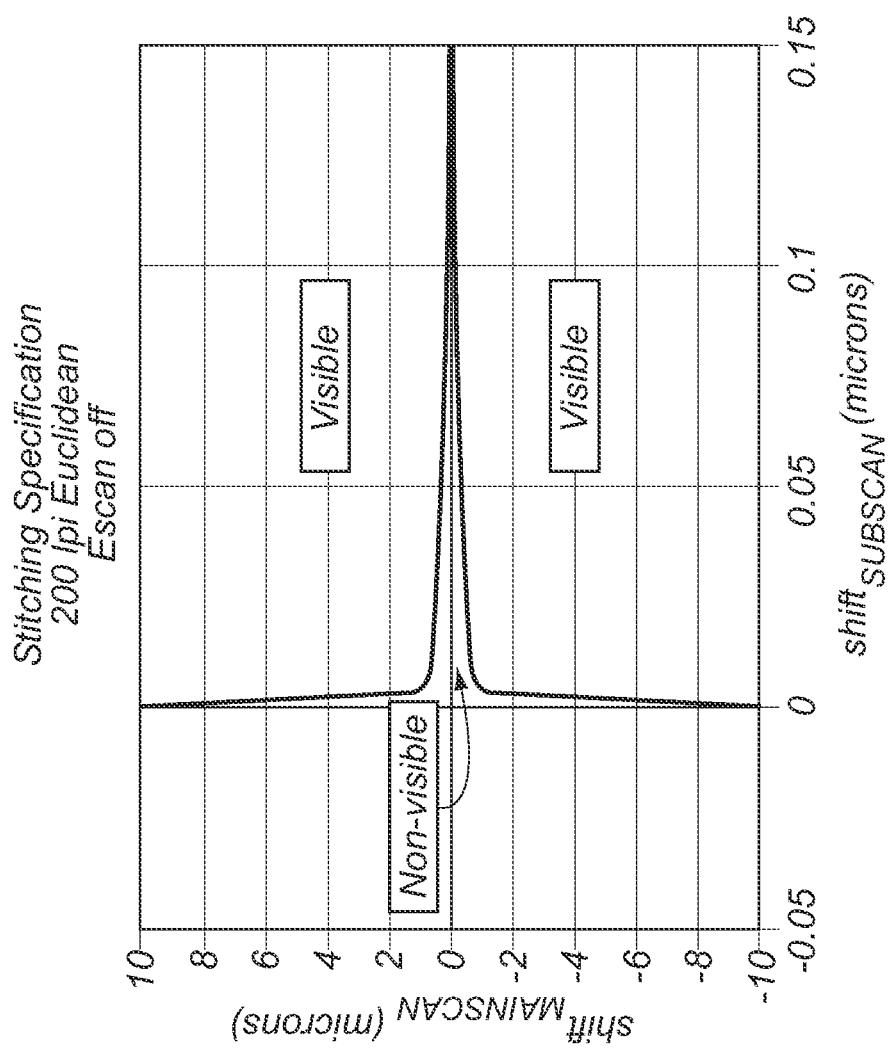
FIG. 8 shows a graph of an embodiment of the invention for various combinations of main-scan and sub-scan misalignments between merged image pixel arrangements.

FIG. 8 shows a graph determined in accordance with relationship (5) for a 200 lpi Euclidean screen formed without the aid of Escan techniques. The FIG. 8 graph provides a stitching specification that specifies various combinations of main-scan and sub-scan misalignments between merged image pixel arrangements 50 that result in visible stitching artifacts and non-visible stitching artifacts for this screen. As indicated in Table 1, the $\Delta\text{tint}_{MAX}$ employed in the derivation of this graph is 41.7%. The positive values of $\text{shift}_{SUB-SCAN}$ in the FIG. 8 graph represent a sub-scan misalignment that causes merged image pixel arrangements 50 to come together. The curve defined by relationship (5) is mirrored about the $\text{shift}_{SUB-SCAN}$ axis to represent both positive and negative main-scan misalignments. The FIG. 8 graph shows that a relatively high sensitivity to misalignments along the sub-scan direction exists. Minor amount of main-scan misalignments of less than 1 micron can only be tolerated for sub-scan misalignments that are smaller than 0.1 micron.

Relationships similar to relationship (5) can be derived for conditions in which Escan techniques are employed. Two such derived relationships are as follows:

$$\text{shift}_{MAINSCAN} = ((26/\Delta\text{tint}_{MAX}) - (2 \times \text{shift}_{SUBSCAN}^{0.52})/ (10.6 + \text{shift}_{SUBSCAN})^{0.52}; \text{ and} \tag{6}$$

$$\text{shift}_{MAINSCAN} = (26/\Delta\text{tint}_{MAX})/(10.6 + \text{shift}_{SUBSCAN})^{0.52}. \tag{7}$$

Relationship (6) represents a case in which a sub-scan misalignment causes adjacent image pixels arrangements 50 merged with Escan techniques to come together. Relationship (7) represents a case in which a sub-scan misalignment causes adjacent image pixel arrangements 50 merged with Escan techniques to move apart from one another.

Figure 9A:
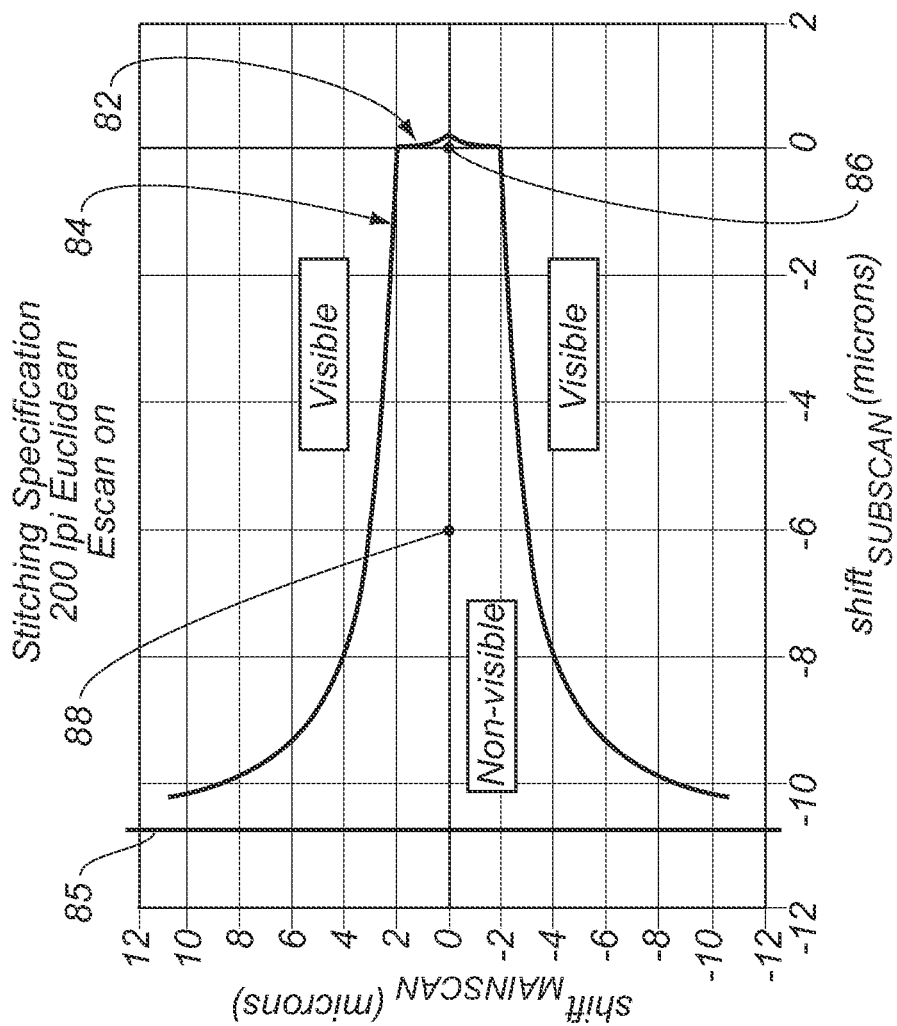
FIG. 9A shows a graph for an embodiment of the invention for various combinations of main-scan and sub-scan misalignments between merged image pixel.

FIG. 9A shows a graph determined in accordance with relationships (6) and (7) for a 200 lpi Euclidean screen formed with the aid of Escan techniques. The FIG. 9A graph provides a stitching specification for this screen that specifies various combinations of main-scan and sub-scan misalignments between adjacent image pixel arrangements 50 that result in visible stitching artifacts and non-visible stitching artifacts. As in FIG. 8, a $\Delta\text{tint}_{MAX}$ value equal to 41.7% is employed in the derivations of the FIG. 9A graph. The illustrated positive values of $\text{shift}_{SUB-SCAN}$ represent sub-scan misalignments that cause merged image pixel arrangements 50 to come together while the negative values of $\text{shift}_{SUB-SCAN}$ represent sub-scan misalignments that cause merged image pixel arrangements 50 to move apart. In this regard, portion 82 of the curve is defined by relationship (6) while portion 84 is defined by relationship (7). Portions 82 and 84 of the curve are mirrored about the $\text{shift}_{SUB-SCAN}$ axis to represent both positive and negative main-scan misalignments. Line 85 is positioned at a $\text{shift}_{SUBSCAN}$ value of −10.7 microns and represents a condition where two image pixel arrangements 50 that are merged using Escan techniques are misaligned apart from one another by an amount sufficient to form a gap between the two. In this regard, the graph is predicated on the use of Escan techniques which establish one image pixel width (i.e. 10.7 microns) of overlap between the merged image pixel arrangements 50. Accordingly, the $\text{shift}_{SUBSCAN}$ value of −10.7 microns is sufficient to overcome this overlap.

The FIG. 9A graph indicates that the use of Escan techniques allows for significant sub-scan misalignments that cause merged image pixel arrangements 50 to be moved apart form one another. Unlike the FIG. 8 graph which shows that stitching artifacts can easily arise from very minor amounts of sub-scan misalignments, the use of Escan techniques allows for significantly larger sub-scan misalignments prior to the onset of stitching artifacts. The FIG. 9A graph also shows that the use of Escan techniques allows for larger main-scan misalignments for a given sub-scan misalignment that causes the merged image pixel arrangements 50 to be moved apart form one another.

An additional important observation can be made from the FIG. 9A graph. Many recording apparatus 10 are calibrated to merge a boundary of a first image pixel arrangement 50 with a boundary of a second image pixel arrangement 50 with little overlap in order to achieve as close to perfect register as possible between the two merged boundaries. The desire for perfect register between merged image pixel arrangements 50 has also been mandated when Escan techniques have been employed in conventional recording apparatus. For example, commonly-assigned U.S. Pat. No. 5,818,498 Richardson et al.), teaches the use of Escan techniques in which image pixels 45 formed in accordance with the same image data 37 in each of two merged image pixel arrangements 50 overlap and register with one another. Point 86 in the parameter space defined by the FIG. 9A graph corresponds to a point of perfect register (i.e. no sub-scan misalignment) when Escan techniques are employed. Although point 86 is positioned within a region of the graph where stitching artifacts are not visible it is very close to a boundary of the region of the graph where stitching artifacts are visible. Accordingly even at this location, various factors such as jitter in the movement of carriage 18 can lead to a sub-scan misalignment that can cause a visible artifact to arise.

In one example embodiment of the invention, Escan data manipulation techniques are employed but image pixels arrangements 50 are merged at a position other than a position of perfect register. For example, point 88 corresponds to one such possible point in the parameter space define by the FIG. 9A graph. Point 88 corresponds to a location where image pixel arrangements 50 formed in accordance with Escan techniques are merged together such that their boundaries overlap one another by an amount that is less than a size of each of the image pixels 45 that make up the image pixel arrangements 50. Specifically, point 88 allows over 6 microns of sub-scan misalignment before merged image pixel arrangements 50 are displaced with respect to one another to form a visible stitching artifact. Further point 88 allows up to approximately ±3 microns of main-scan misalignment prior the formation of a visible artifact. It is understood that point 88 is described by example only and other suitable points are with the scope of the present invention.

Figure 10:
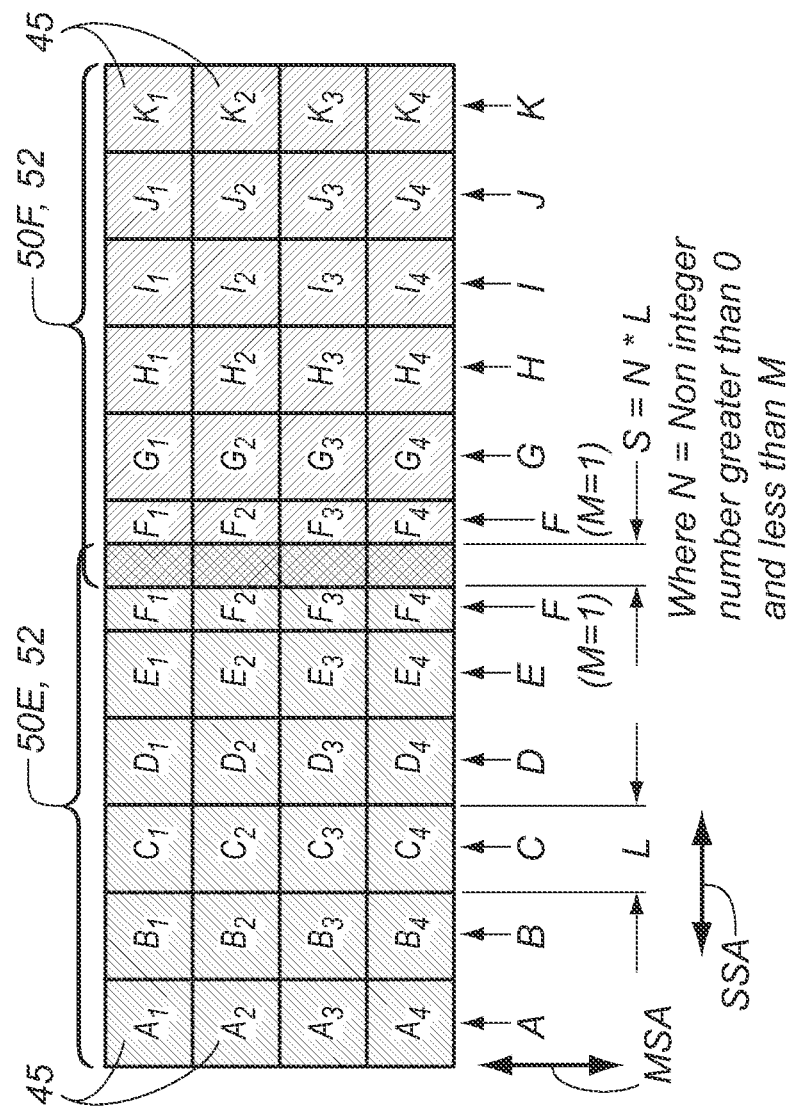
FIG. 10 shows a first image pixel arrangement merged together with a second image pixel arrangement with improved Escan techniques as per an example embodiment of the invention.

FIG. 10 shows a first image pixel arrangement 50E merged together with a second image pixel arrangement 50F with Escan techniques as per an example embodiment of the invention. For clarity, each of the first and second image pixel arrangements 50E and 50F are patterned differently. Each of the first and second image pixel arrangements 50E and 50F is formed separately during different marking operations which can include scanning operations for example. Each of the first and second image pixel arrangements 50E and 50F comprise a plurality of image pixel columns 52 (i.e. six in this example embodiment). For clarity each of the image pixel columns 52 is identified by one of the letters A, B, C, D, E, F, G, H, I, J, and K. It is noted that each of the first and second image pixel arrangements 50E and 50F include an image pixel column 52 identified by the letter F. Each of the image pixel columns 52 extends along a first direction which is a direction of main-scan axis MSA in this example embodiment. Each image pixel column 52 is made up of a plurality of image pixels 45, each of the image pixels 45 being formed in accordance with corresponding image data 37. For clarity each image pixel 45 in each image pixel column 52 is identified by a subscript of the letter that identifies each image pixel column 52. Each image pixel 45 in each of the first and second image pixel arrangements 50E and 50F has a size L along a second direction that intersects the first direction. In this example embodiment, the second direction corresponds to a direction of sub-scan axis SSA.

First image pixel arrangement 50E is formed first on the recording media 17 during a first marking operation. First image pixel arrangement 50E includes a first set of M image pixel columns 52, wherein M is an integer number greater than or equal to 1, and one or more image pixels in the first set of M image pixel columns are formed in accordance with first image data 37. Specifically, in this example embodiment M=1 and corresponds to the image pixel column 52 identified as F in first image pixel arrangement 50E. In other example embodiments, M can equal an integer number greater than 1.

Second image data 37 is provided for the formation of second image pixel arrangement 50F that is formed in a second marking operation. The second image data 37 is modified to include the first image data 37 and the second image pixel arrangement 50F is formed in accordance with the modified second image data 37 during a second marking operation. Specifically, the second image pixel arrangement 50F is formed with a second set of M image pixel columns 52 that includes various image pixels 45 formed in accordance with the first image data 37 in the modified second image data 37. In this example embodiment, the second set of M image pixels columns 52 corresponds to the image pixel column 52 identified as F in the second image pixel arrangement 50F. Accordingly, each of the image pixel columns identified by the letter F is formed with the same image data 37.

In accordance with an aspect of the present invention, FIG. 10 shows each of the first and second image pixel arrangements 50E and 50F is formed such that a distance between the first set of M image pixel columns 52 and the second set of M image pixel columns 52 is adjusted to cause the first set of M image pixel columns 52 to be overlapped by the second set of M image pixel columns 52 by an amount S along the second direction. In this example embodiment S=N*L, and N is a non-integer number selected to be greater than 0 and less than M. Since M is equal to one (1) in this illustrated embodiment the image pixel column 52 identified by the letter F in the first image pixel arrangement 50E is overlapped by the image pixel column 52 identified by the letter F in the second image pixel arrangement 50F by an amount selected to be greater than 0 and less than L. In this example embodiment, the second image pixel arrangement 50F is formed such that each image pixel of the one or more image pixels 45 in the second set of M image pixel columns 52 partially overlaps a corresponding image pixel 45 of the one or more image pixels in the first set of M image pixel columns 52. As shown in FIG. 10 the second image pixel arrangement 50F is formed such that each image pixel of the one or more image pixels 45 in the second set of M image pixel columns 52 partially overlaps a region of recording media 17 adjacent to the first image pixel arrangement 50E. In this example embodiment, the amount of partial overlap created between the first set of M image pixel columns 52 and the second set of M image pixels columns 52 can be selected to reduce occurrences of stitching artifacts between the first and second image pixel arrangements 50E and 50F.

The distance between the first set of M image pixel columns 52 and the second set of M image pixel columns 52 can be adjusted by adjusting an alignment between the first image pixel arrangement 50E and the second image pixel arrangement 50F. The distance between the first set of M image pixel columns 52 and the second set of M image pixel columns 52 can be adjusted by adjusting a position along the second direction of at least one of the first image pixel arrangement 50E and the second image pixel arrangement 50F. In some example embodiments, the distance between the first set of M image pixel columns 52 and the second set of M image pixel columns 52 is adjusted by positionally biasing at least one of the first image pixel arrangement 50E and the second image pixel arrangement 50F away from a position on the recording media 17 where the second set of M image pixel columns 52 would overlap and register along the second direction with the first set of M image pixel columns 52. In some example embodiments, each of the first image pixel arrangement 50E and the second image pixel arrangement 50F is positionally biased away from the other.

In some example embodiments, the distance between the first set of M image pixel columns 52 and the second set of M image pixel columns 52 can be adjusted by establishing relative movement between the recording channels 23 and the recording media 17 while forming each of the first image pixel arrangement 50E and the second image pixel arrangement 50F. In some example embodiments, the distance between the first set of M image pixel columns 52 and the second set of M image pixel columns 52 can be adjusted by adjusting a scanning direction of the recording channels 23 over the recording media 17. For example, when helical scanning techniques are employed, each the first and second image pixel arrangements 50E and 50F are image swaths that are each formed while simultaneously moving the media support 12 along a main-scan direction and carriage 18 along a sub-scan direction. Accordingly, each of image pixel columns 52 is skewed relative to the main-scan axis MSA by skew angle related to the established relative movement.

In some example embodiments, the skew angle of one or more of the image pixel columns 52 in the first image pixel arrangement 50E is adjusted relative to the main-scan axis MSA to cause the first set of M image pixel column 52 to be overlapped partially along the sub-scan direction by the second set of M image pixel columns 52 in accordance with aspects of the present invention. In some example embodiments, a movement of carriage 18 along sub-scan axis SSA is adjusted to adjust the skew angle of the one or more image pixel columns 52 in the first image pixel arrangement 50E relative to the main-scan axis. In some example embodiments, carriage 18 is moved along the sub-scan axis SSA by a distance that is less than a sub-scan size of the first image pixel arrangement 50E during the formation of the first image pixel arrangement 50E. In some example embodiments, carriage 18 is moved along the sub-scan axis SSA by a distance that is equal to a non-integer multiple of L during the formation of the first image pixel arrangement 50E. In some example embodiments, a movement of the media support 12 along a main-scan direction is adjusted to adjust the skew angle of the one or more image pixel columns 52 in the first image pixel arrangement 50E relative to the main-scan axis MSA.

In some example embodiments, a sub-scan size of at least the first image pixel arrangement 50E is adjusted to cause the first set of M image pixel column 52 to be overlapped partially along the sub-scan direction by the second set of M image pixel columns 52 in accordance with aspects of the present invention. For example, when helical scanning techniques are employed to form each of the image pixel arrangements 50, the particular speed of carriage 18 will determine a particular positioning between the first image pixel arrangement 50E and the second image pixel arrangement 50F. By way of non-limiting example, this particular positioning can include a position where a boundary of the first image pixel arrangement 50E merges with a boundary of the second image pixel arrangement 50F with no significant overlap, or a positioning where the second set of M image pixel columns 52 overlaps and registers with the first set of M image pixel columns 52. An amount of overlap between the first image pixel arrangement 50E and the second image pixel arrangement 50F at this particular positioning can be adjusted by varying a sub-scan size of one or both of the first image pixel arrangement 50E and the second image pixel arrangement 50F. Adjustment of a sub-scan size of one or both of the first image pixel arrangement 50E and the second image pixel arrangement 50F can be used to cause the first set of M image pixel columns 52 to be overlapped partially along the sub-scan direction by the second set of M image pixel columns 52 in accordance with aspects of the present invention. In some example embodiments, adjustment of a sub-scan size of an image pixel arrangement 50 can be accomplished by rotating recording head 16 by a desired angle about an axis that extends along a direction that comprises a component substantially perpendicular to an imageable surface of recording media 17. In some example embodiments, adjustment of a sub-scan size of an image pixel arrangement 50 can be accomplished by adjusting a magnification of the plurality of radiation beams 21 emitted by recording head 16. In various example embodiments, carriage 18 is moved during the formation of each image pixel arrangement 50 by a distance along the sub-scan direction that is different than the adjusted sub-scan size of each of at least one of the first image pixel arrangement 50E and the second image pixel arrangement 50F. It is understood that various combinations of image pixel arrangement 50 sub-scan sizes and carriage 18 speeds can be used to cause the first set of M image pixel column 52 to be overlapped partially along the sub-scan direction by the second set of M image pixel columns 52 in accordance with aspects of the present invention.

In some example embodiments, a first set of the recording channels 23 is operated to form the first set of M image pixel columns 52 and a second set of the recording channels 23 different from the first set is operated to form the second set of M image pixel columns 52. In some example embodiments, a first set of recording channels 23 is operated to form the first image pixel arrangement 50E and a second set of the recording channels 23 different from the first set is operated to form the second image pixel arrangement 50F. Different sets of recording channels 50 can be provided in different recording heads 16 in some example embodiments.

In some example embodiments, the distance between the first set of M image pixel columns 52 and the second set of M image pixel columns 52 can be adjusted based at least on a predicted or measured positional misalignment along a sub-scan direction between the recording channels 23 and the recording media 17 during the formation of at least one of a plurality of image pixel arrangement 50. In some scanning operations, the distance between the first set of M image pixel columns 52 and the second set of M image pixel columns 52 can be adjusted based at least on a predicted or measured positional misalignment along a sub-scan direction between emitted radiation beams 21 and the recording media 17 during the formation of at least one of a plurality of image pixel arrangements 50.

In some example embodiments, a plurality of image pixel arrangements 50 is to be formed. Each image pixel arrangement 50 includes a plurality of image pixel columns 52 which each extend along a first direction and are each arranged along a second direction that intersects the first direction. In these example embodiments, an amount of overlap along the second direction between a first image pixel arrangement 50 that is to be merged with a second image pixel arrangement 50 is determined based at least on a misalignment between two image pixel arrangements 50 along the first direction. In some example embodiments, the misalignment along the first direction can be a predicted misalignment between the first and second image pixel arrangements 50 or a measured misalignment between two image pixel arrangements 50. For example, in the FIG. 9A graph, point 88 corresponds to a location where image pixel arrangements 50 formed in accordance with Escan techniques are merged together such that their boundaries overlap one another by an amount that is less than a size of the image pixels 45 that make up the image pixel arrangements 50. Point 88 can be selected if a measured or predicted misalignment between merged image pixel arrangements 50 is less than approximately +/−3 microns along an extension direction of the image pixel columns 52.

Figure 9B:
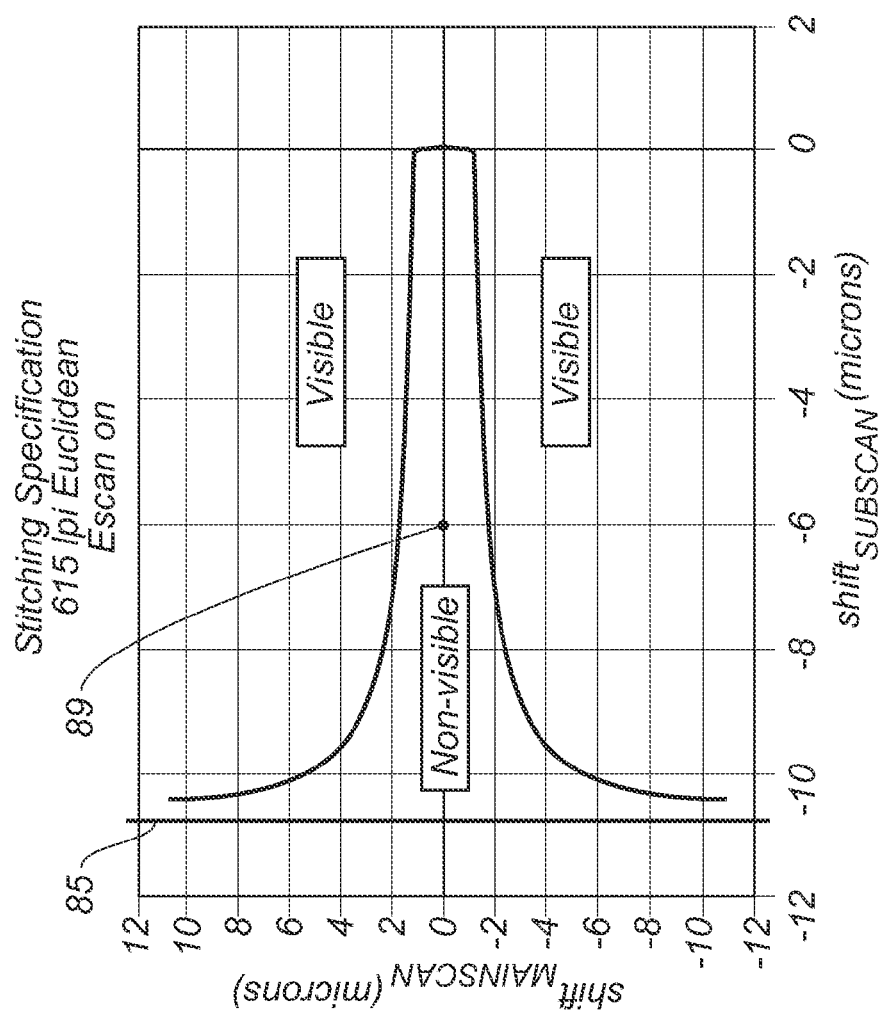
FIG. 9B shows a graph for an embodiment of the invention for various combinations of main-scan and sub-scan misalignments between merged image pixel arrangements.

The FIG. 9A graph is based on a specific screen type, namely a 200 lpi Euclidean screen. The present inventors have determined that the level of sensitivity to main-scan misalignments can vary for different screens or different screen parameters. Accordingly, different graphs can be associated with different screens or different screen parameters. For example, FIG. 9B shows a graph similar to the FIG. 9A but is generated for a 615 lpi Euclidean screen. Point 89 in the FIG. 9B graph corresponds to point 88 in the FIG. 9A graph in that they are both associated with a shift$_{SUBSCAN}$ value of −6 microns. Upon comparing the FIG. 9A graph and the FIG. 9B graph, one notes that the 615 lpi Euclidean screen is more sensitive to main-scan misalignments than it 200 lpi counterpart. Specifically, at the −6 micron shift$_{SUBSAN}$ value, the 615 lpi Euclidean screen can tolerate less than +/−2 microns before visible artifacts arise. If larger mains-scan misalignments are expected, then a different amount of sub-scan overlap may be appropriate. Similar graphs for other types of halftone and stochastic screens can also show different sensitivities to main-scan misalignments between merged image pixel arrangements 50. In some example embodiments, a specific screen or screen parameter having a worst case sensitivity is identified and other screens are formed in accordance with image pixel arrangement 50 overlap parameters associated with the specific screen.

Accordingly, in some example embodiments, the amount of overlap between a first image pixel arrangement 50 that is to be merged with a second image pixel arrangement 50 is determined based at least on an image pixel pattern consisting of one of a stochastic pattern, a halftone pattern, and a hybrid pattern. In some example embodiments, an image pixel pattern is selected from a plurality of image pixel patterns, and an amount of overlap between a first image pixel arrangement 50 that is to be merged with a second image pixel arrangement 50 is determined based at least on a misalignment between two image pixel arrangements 50 along an extension direction of the image pixel columns 52 and the selected image pixel pattern. In some example embodiments, the amount of overlap is also determined based at least on a property of the recording media 17. In some example embodiments employing scanning techniques, a first image pixel column 52 in a first image swath is overlapped by a second image pixel column 52 in second swath by a sub-scan amount that is determined based at least on a main-scan misalignment between two of the image swaths.

A program product can be used by controller 30 to perform various functions required by recording apparatus 10. One such function can include stitching a plurality of image pixel arrangement 50 in accordance with a method or combination of methods taught herein. Without limitation, the program product may comprise any medium which carries a set of computer-readable signals comprising instructions which, when executed by a computer processor, cause the computer processor to execute a method as described herein. The program product may be in any of a wide variety of forms. The program product can comprise, for example, physical media such as magnetic storage media including, floppy diskettes, hard disk drives, optical data storage media including CD ROMs, DVDs, electronic data storage media including ROMs, flash RAM, or the like. The instructions can optionally be compressed and/or encrypted on the medium.

It is to be understood that the exemplary embodiments of the invention are merely illustrative and that many variations of the described embodiments can be devised by those skilled in the art without departing from the scope of the invention. In this regard, it is to be understood that various aspects of one or more of the example embodiment can be combined with aspects of other example embodiments without departing from the scope of the present invention.

| PARTS LIST | |
| --- | --- |
| 10 | recording apparatus |
| 12 | media support |
| 13 | cylindrical surface |
| 16 | recording head |
| 17 | recording media |
| 18 | carriage |
| 19 | image |
| 20 | support |
| 21 | radiation beams |
| 22 | motion system |
| 23 | recording channels |
| 25 | registration features |
| 28 | clamps |
| 30 | controller |
| 32 | guide system |
| 33 | transmission member |
| 37 | image data |
| 45 | image pixels |
| 45A | image pixel |
| 45B | image pixel |
| 45C | image pixel |
| 50 | image pixel arrangements |
| 50A | first image pixel arrangement |
| 50B | second image pixel arrangement |
| 50C | first image pixel arrangement |
| 50D | second image pixel arrangement |
| 50E | first image pixel arrangement |
| 50F | second image pixel arrangement |
| 52 | image pixel columns |
| 54 | image pixel rows |
| 56 | merge lines |
| 56A | merge line |
| 56B | merge line |
| 58A | artifact |
| 58B | artifact |
| 58C | artifact |
| 58D | artifact |
| 58E | artifact |
| 60 | first direction |
| 62 | second direction |
| 70 | unit cell |
| 70A | unit cell |
| 70B | unit cell |
| 71 | point |

-continued

| | PARTS LIST |
|---|---|
| 73 | point |
| 74 | broken lines |
| 75 | broken lines |
| 80 | row |
| 82 | portion |
| 84 | portion |
| 85 | line |
| 86 | point |
| 88 | point |
| 89 | point |
| MSA | main-scan axis |
| SSA | sub-scan axis |
| W | width |

The invention claimed is:

1. A method for forming a halftone image on recording media, the method comprising:
proving a recording head comprising a plurality of individually addressable recording channels;
operating the recording head to form a plurality of image swaths, each of the image swaths being formed during a separate scan over the recording media;
identifying a plurality of locations within a representative unit cell of the halftone image;
determining a quantified value for each location, wherein each quantified value is determined based at least on a sub-scan misalignment associated with a proposed merging of two image swaths at the location corresponding to the quantified value;
selecting a merge location from the plurality of locations, the merge location corresponding to a desired one of the quantified values;
operating the recording head to form the halftone image on the recording media while merging a first image swath and a second image swath at the selected merge location within a first unit cell of the halftone image; and
comprising determining a screen angle of the halftone image, and operating the recording head to merge the first image swath and the second image swath at the selected merge location within the first unit cell in the event that the screen angle is determined to be 0 degrees or an integer multiple of 45 degrees.

2. A method according to claim 1, wherein each of the quantified values represents a tint change determined based at least on the sub-scan misalignment associated with the proposed merging of two image swaths at the location corresponding to the quantified value.

3. A method according to claim 2, comprising determining which of the quantified values represents a maximum tint change, wherein the merge location is selected to be one of the locations other than the location corresponding to the maximum tint change.

4. A method according to claim 2, comprising determining which of the quantified values represents a minimum tint change, wherein the merge location is selected to be one of the locations corresponding to the minimum tint change.

5. A method according to claim 1, each quantified value is determined based at least on a background tint of the representative unit cell.

6. A method according to claim 1, comprising operating the recording head to merge the first image swath and the second image swath at a random location within the first unit cell in the event that the screen angle is determined to be other than 0 degrees or an integer multiple of 45 degrees.

7. A method for forming a halftone image on recording media, the method comprising:
providing a recording head comprising a plurality of individually addressable recording channels;
operating the recording head to form a plurality of image swaths, each of the image swaths being formed during a separate scan over the recording media;
identifying a plurality of locations within a representative unit cell of the halftone image;
determining a quantified value for each location, wherein each quantified value is determined based at least on a sub-scan misalignment associated with a proposed merging of two image swaths at the location corresponding to the quantified value;
selecting a merge location from the plurality of locations, the merge location corresponding to a desired one of the quantified values:
operating the recording head to form the halftone image on the recording media while merging a first image swath and a second image swath at the selected merge location within a first unit cell of the halftone image; and
comprising adjusting a sub-size of the second image swath to cause a third image swath to merge with the second image swath at the selected merge location within a second unit cell of the halftone image.

8. A method according to claim 7, wherein the sub-scan size of the second image swath is different than a sub-scan size of at least one of the first image swath and the third image swath.

9. A method for forming a halftone image on recording media, wherein the halftone image comprises a plurality of unit cells and the method comprises:
providing a recording head comprising a plurality of individually addressable recording channels;
operating the recording head to form a plurality of image swaths, each of the image swaths being formed during a separate scan over the recording media;
identifying a plurality of locations within a representative unit cell of the halftone image;
sequentially imposing a plurality of different background tints on the representative unit cell;
for each location, determining a set of quantified values, wherein each quantified value in each set corresponds to a tint change in a region of a different one of the background tints arising from a sub-scan misalignment associated with a proposed merging of two image swaths at the location;
identifying one of the locations having an associated set of the quantified values that includes at least one quantified value corresponding to an undesired tint change;
selecting a merge location from the plurality of locations, the merge location being other than identified one of the locations;
operating the recording head to form the image on the recording media while merging a first image swath and a second image swath at the selected merge location within a unit cell of the halftone image; and
comprising determining a screen angle of the halftone image and operating the recording head to merge the first image swath and the second image swath at the selected merge location within the unit cell in the event that the screen angle is determined to be 0 degrees or an integer multiple of 45 degrees, and operating the recording head to merge the first image swath and the second image swath at a random location within the unit cell in the event that the screen angle is determined to be other than 0 degrees or an integer multiple of 45 degrees.

10. A method according to claim 9, comprising adjusting a sub-scan pitch of the image swaths to cause each of the image swaths to merge with another of the image swaths at the selected merge location within one of the unit cells of the halftone image.

11. A method according to claim 9, comprising adjusting a sub-scan size of the image swaths to cause each of the image swaths to merge with another of the image swaths at the selected merge location within one of the unit cells of the halftone image.

* * * * *